(12) United States Patent
Rosen et al.

(10) Patent No.: US 9,594,346 B2
(45) Date of Patent: Mar. 14, 2017

(54) METHOD AND SYSTEM FOR IMAGING AN OBJECT USING INCOHERENT LIGHT

(75) Inventors: Joseph Rosen, Omer (IL); Barak Katz, Ashkelon (IL)

(73) Assignee: Ben-Gurion University of the Negev Research and Development Authority, Beer-Sheva (IL)

( * ) Notice: Subject to any disclaimer, the term of this patent is extended or adjusted under 35 U.S.C. 154(b) by 0 days.

(21) Appl. No.: 13/260,569

(22) PCT Filed: Mar. 31, 2010

(86) PCT No.: PCT/IB2010/051401
§ 371 (c)(1),
(2), (4) Date: Oct. 31, 2011

(87) PCT Pub. No.: WO2010/113123
PCT Pub. Date: Oct. 7, 2010

(65) Prior Publication Data
US 2012/0050832 A1    Mar. 1, 2012

Related U.S. Application Data

(60) Provisional application No. 61/202,763, filed on Apr. 1, 2009.

(51) Int. Cl.
*G03H 1/04* (2006.01)
*G03H 1/02* (2006.01)
*G03H 1/06* (2006.01)

(52) U.S. Cl.
CPC .......... *G03H 1/041* (2013.01); *G03H 1/0443* (2013.01); *G03H 1/06* (2013.01); *G03H 2001/0224* (2013.01); *G03H 2001/046* (2013.01); *G03H 2001/0447* (2013.01); *G03H 2001/0458* (2013.01); *G03H 2223/23* (2013.01)

(58) Field of Classification Search
CPC .......................... G03H 1/06; G03H 2001/046
USPC .................. 359/9, 35; 250/550; 356/457
See application file for complete search history.

(56) References Cited

U.S. PATENT DOCUMENTS 5,138,471 A  *  8/1992  McGrew ........................ 359/21

FOREIGN PATENT DOCUMENTS

| EP | 0540667 | 5/1993 |
|---|---|---|
| WO | WO 2006125975 A1 * | 11/2006 |
| WO | WO 2008/010790 | 1/2008 |
| WO | WO 2008/094141 | 8/2008 |
| WO | WO 2010113123 A1 * | 10/2010 |

OTHER PUBLICATIONS

International Preliminary Report on Patentability Dated Oct. 13, 2011 From the International Bureau of WIPO Re. Application No. PCT/IB2010/051401.

(Continued)

*Primary Examiner* — Thomas K Pham
*Assistant Examiner* — Cara Rakowski

(57) ABSTRACT

A method of generating a hologram of an object is disclosed. The method comprises: receiving data corresponding to a plurality of non-coherent sub-holograms acquired by an optically passive synthetic aperture holographic apparatus, combining the sub-holograms to generate a mosaic hologram of the object, and transmitting the mosaic hologram to a computer readable medium.

29 Claims, 13 Drawing Sheets

(56) References Cited

OTHER PUBLICATIONS

Communication Pursuant to Article 94(3) EPC Dated Jan. 24, 2013 From the European Patent Office Re. Application No. 10716093.9.
International Search Report and the Written Opinion Dated Aug. 6, 2010 From the International Searching Authority Re. Application No. PCT/IB2010/051401.
Beck et al. "Synthetic-Aperture Imaging Laser Radar: Laboratory Demonstration and Signal Processing", Applied Optics, 44(35): 7621-7629, Dec. 10, 2005.
Indebetouw et al. "Scanning Holographic Microscopy With Resolution Exceeding the Rayleigh Limit of the Objective by Superposition of Off-Axis Holograms", Applied Optics, 46(6): 993-1000, Feb. 20, 2007.
Martínez-León et al. "Synthetic Aperture Single-Exposure On-Axis Digital Holography", Optics Express, 16(1): 161-169, Jan. 7, 2008.
Mico et al. "Synthetic Aperture Superresolution With Multiple Off-Axis Holograms", Journal of the Optical Society of America A, 23(12): 3162-3170, Dec. 2006.
Rosen et al. "Digital Spatially Incoherent Fresnel Holography", Optics Letters, 32(8): 912-914, Apr. 15, 2007.
Rosen et al. "Fluorescence Incoherent Color Holography", Optics Express, 15(5): 2244-2250, Mar. 5, 2007.
Rosen et al. "Holographic Three-Dimensional Computer-Aided Imaging", Current Research on Image Processing for 3D Information Displays, Proceedings of SPIE, XP002588166, 5821: 1-21, Feb. 28, 2005. Abstract, Figs.1, 7, p. 2, 11-15.
Rosen et al. "Non-Scanning Motionless Fluorescence Three-Dimensional Holographic Microscopy", Nature Photonics, 2: 190-195, Mar. 2008.
Shaked et al. "Holography of Incoherently Illuminated 3D Scenes", Defense and Security 2008: Special Sessions on Food Safety, Visual Analytics, Resource Restricted Embedded and Sensor Networks, and 3D Imaging and Display, Proceedings of the SPIE, XP002588167, 6983: 1-14, May 22, 2008. Abstract, p. 4-8, 11, 12.
Yamaguchi et al. "Phase-Shifting Digital Holography", Optics Letters, 22(16): 1268-1270, Aug. 15, 1997.
Official Action Dated Oct. 30, 2014 From the US Patent and Trademark Office Re. U.S. Appl. No. 13/260,569.
Communication Pursuant to Article 94(3) EPC Dated Jul. 14, 2015 From the European Patent Office Re. Application No. 10716093.9.
Office Action Dated Jul. 27, 2015 From the Israel Patent Office Re. Application No. 215394.
Translation Dated Aug. 13, 2015 of Office Action Dated Jul. 27, 2015 From the Israel Patent Office Re. Application No. 215394.
Office Action Dated Jul. 27, 2016 From the Israel Patent Office Re. Application No. 215394 and Its Translation Into English.

\* cited by examiner

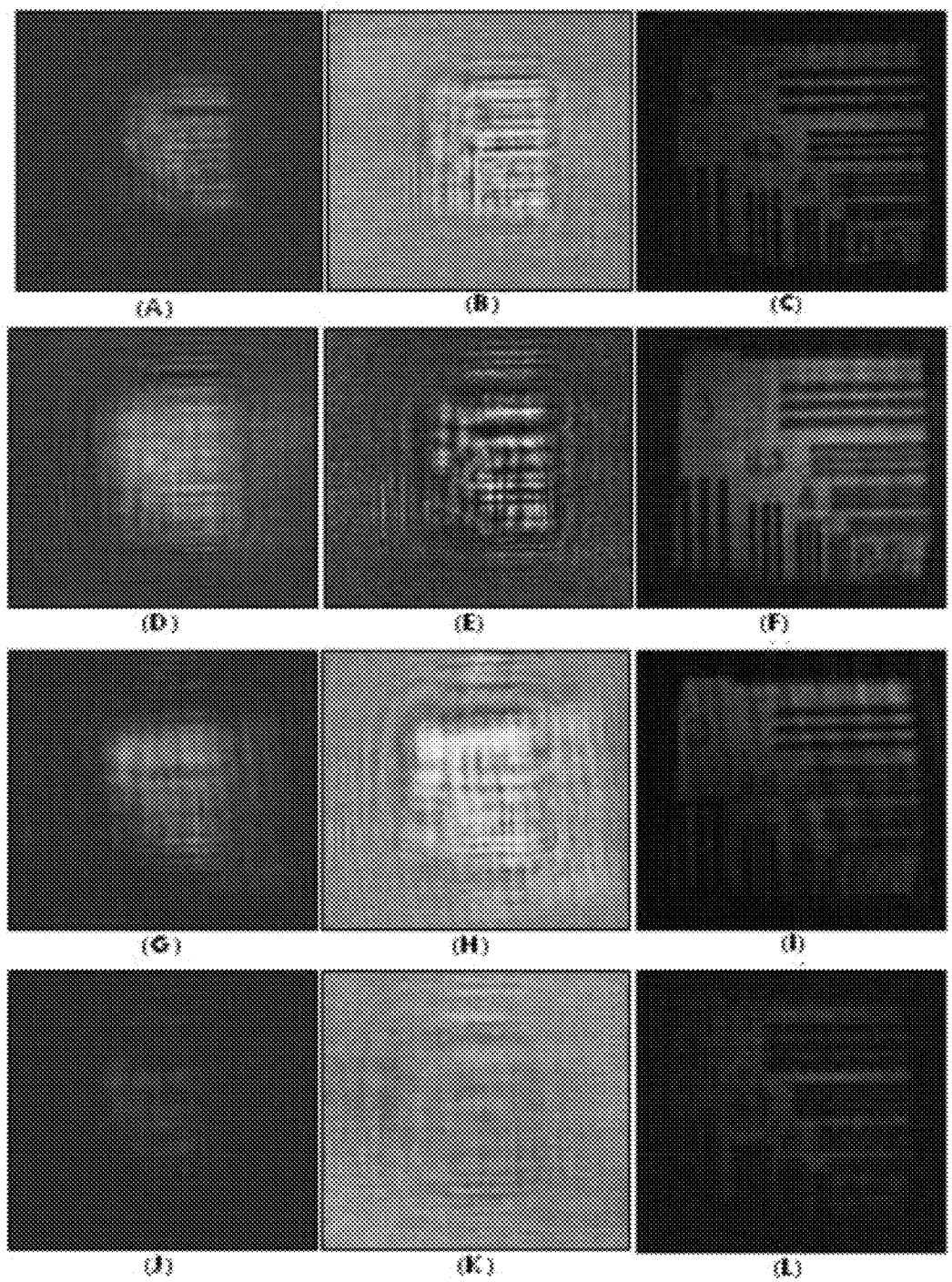
FIGS. 14A-L

METHOD AND SYSTEM FOR IMAGING AN OBJECT USING INCOHERENT LIGHT

RELATED APPLICATIONS

This application is a National Phase of PCT Patent Application No. PCT/IB2010/051401 having International filing date of Mar. 31, 2010 which claims the benefit of priority of U.S. Provisional Patent Application No. 61/202,763, filed on Apr. 1, 2009. The contents of the above applications are all incorporated herein by reference.

FIELD AND BACKGROUND OF THE INVENTION

The present invention, in some embodiments thereof, relates to imaging and, more particularly, but not exclusively, to holographic imaging.

Techniques for capturing three-dimensional information from physical objects include tomography range-imaging and holography.

In tomography, several images of the object are captured from different points of view. Three-dimensional object information is then extracted by processing the successive images.

In range-imaging, the distance between the camera and various points on the surface of the object are measured, and a three-dimensional image or model of the object is constructed based on the measured distances. The distances are measured by illuminating the surface of the object with a laser and measuring the amount of time required for the laser light to travel between the object and the laser source. In some techniques a pattern is projected on the surface of the object using a scanning laser beam, and the deformation in the observed pattern is examined to determine the geometric information of the object.

In holography, holograms are constructed by recording the interference pattern of a coherent object bearing beam and a coherent reference beam. The image of the object is usually reconstructed by directing the same coherent reference beam at the holograms. Two standard techniques for the production of the holographs are known. In a first standard technique, the object is irradiated with laser light and an interference pattern between a reference wave and wave patterns reflected from the object are recorded in and a laser light-sensitive emulsion for the production of a hologram. In a second standard technique, an object wave is interrupted using a diffusing medium integral and the unobstructed or transmitted portion of the subject wave thus produced is caused to interfere with a reference wave.

International Patent Publication Nos. WO 2008/010790 and WO 2008/094141, the contents of which are hereby incorporated by reference, disclose a technique for capturing three-dimensional information of an object, using incoherent light such as reflected sunlight that is passively received from the object. The technique does not require interference between light scattered by the object and light not scattered by the object. An optical assembly transforms the received light and transmits the transformed light to an image capture assembly that captures a two-dimensional intensity image of the transformed light. The two-dimensional intensity image includes geometric information that is encoded as a Fresnel hologram. Information from a desired in-focus cross-section is extracted based on differences between patterns in that plane and in other planes.

Additional background art includes: Beck et al., "Synthetic-aperture imaging laser radar: laboratory demonstration and signal processing," Appl. Opt. 44, 7621-7629 (2005); Mico et al., "Synthetic aperture superresolution with multiple off-axis holograms," J. Opt. Soc. Am. A 23, 3162-3170 (2006); L. Martínez-León and B. Javidi, "Synthetic aperture single-exposure on-axis digital holography," Opt. Express 16, 161-169 (2008); Indebetouw et al., "Scanning holographic microscopy with resolution exceeding the Rayleigh limit of the objective by superposition of off-axis holograms," Appl. Opt. 46, 993-1000 (2007); J. Rosen, and G. Brooker "Digital spatially incoherent Fresnel holography," Opt. Lett. 32, 912-914 (2007); J. Rosen, and G. Brooker, "Fluorescence incoherent color holography," Opt. Express 15, 2244-2250 (2007); J. Rosen, and G. Brooker, "Non-Scanning Motionless Fluorescence Three-Dimensional Holographic Microscopy," Nature Photonics 2, 190-195 (2008); and I. Yamaguchi and T. Zhang, "Phase-shifting digital holography," Opt. Lett. 22, 1268-1270 (1997).

SUMMARY OF THE INVENTION

According to an aspect of some embodiments of the present invention there is provided a method of generating a hologram of an object, comprising: receiving data corresponding to a plurality of non-coherent sub-holograms acquired by an optically passive synthetic aperture holographic apparatus; combining the sub-holograms to generate a mosaic hologram of the object; and transmitting the mosaic hologram to a computer readable medium.

According to some embodiments of the invention the method further comprises displaying the mosaic hologram.

According to some embodiments of the invention the method comprises generating the data.

According to some embodiments of the invention the method comprises: receiving a wave modulation pattern and defining a plurality of sub-patterns, respectively corresponding to a plurality of views, such that alignment of the sub-patterns according to the views form a mosaic pattern corresponding to the modulation pattern; and for each view, passively collecting non-coherent electromagnetic radiation arriving from the object, modulating the radiation according to a respective sub-pattern to record image data associated with the view, and processing the recorded image data to provide data corresponding to a sub-hologram associated with the view, thereby generating the data.

According to some embodiments of the invention the method comprises filtering the electromagnetic radiation prior to the modulation using a band pass filter.

According to some embodiments of the invention the method comprises polarizing the electromagnetic radiation prior to the modulation.

According to some embodiments of the invention the method comprises collimating the electromagnetic radiation prior to or during the modulation.

According to some embodiments of the invention the collimation is by a collimator characterized by a focal length F, wherein the recording is by a recorder and the modulation is by a modulator between the collimator and the recorder, and wherein the recorder at a distance of from about 0.5 F to about 1.5 F from the modulator.

According to some embodiments of the invention the recording of the image data comprises sequentially recording at least one set of images, each image of the set(s) being characterized a different phase constant, wherein the method further comprises extracting real image data from each set.

According to some embodiments of the invention there is a plurality of sets and the method comprises averaging the real image data over the sets, thereby providing averaged real image data characterized by a signal-to-noise ratio which is higher than a signal-to-noise ratio of real image data of a single set.

According to an aspect of some embodiments of the present invention there is provided a system for generating a hologram of an object. The system comprises: an optically passive synthetic aperture holographic apparatus configured for acquiring data corresponding to a plurality of non-coherent sub-holograms from a plurality of respective views, and a processor configured for combining the sub-holograms to generate a mosaic hologram of the object.

According to some embodiments of the invention the processor is configured for receiving a wave modulation pattern and defining a plurality of sub-patterns, respectively corresponding to the plurality of views, such that alignment of the sub-patterns according to the views form a mosaic pattern corresponding to the modulation pattern.

According to some embodiments of the invention the holographic apparatus is configured for receiving view and sub-pattern data from the processor. For each view, the apparatus assumes a pose to establish a viewing axis corresponding to the view, passively collects non-coherent electromagnetic radiation arriving from the object, and modulates the radiation according to a respective sub-pattern to record image data associated with the view. The processor generates the mosaic hologram based on a collection of image data associated with the plurality of views.

According to some embodiments of the invention the holographic apparatus features a band pass filter for filtering the electromagnetic radiation prior to the modulation.

According to some embodiments of the invention the holographic apparatus comprises a collimator for collimating the electromagnetic radiation prior to or during the modulation.

According to some embodiments of the invention the holographic apparatus comprises a wave modulator for modulating the radiation and a recorder for recording the image data, wherein the modulator is between the collimator and the recorder at a distance of about from about 0.5 F to about 1.5 F from the recorder.

According to some embodiments of the invention the holographic apparatus is configured for sequentially recording at least one set of images, each image of the set(s) being characterized a different phase constant, wherein the processor is configured for extracting real image data from each set.

According to some embodiments of the invention there is a plurality of sets and the processor is configured for averaging the real image data over the sets, thereby providing averaged real image data characterized by a signal-to-noise ratio which is higher than a signal-to-noise ratio of real image data of a single set.

According to some embodiments of the invention the mosaic pattern defines an area which is at least 10 times or at least 100 times or at least 10,000 times or at least 1,000,000 times larger than an area of the largest sub-pattern.

According to some embodiments of the invention the mosaic pattern defines an area of at least 1 square kilometer or at least 10 square kilometers or at least 100 square kilometers or at least 1,000 square kilometers or at least 10,000 square kilometers.

According to some embodiments of the invention the electromagnetic radiation is in the extreme infra ed to X-ray domain.

According to some embodiments of the invention the image data represent Fresnel holograms. According to some embodiments of the invention the image data Fourier holograms. According to some embodiments of the invention the image data represent image hologram. According to some embodiments of the invention the image data represent digital hologram. According to some embodiments of the invention the image data represent non-digital hologram. According to some embodiments of the invention the image data represent on-axis hologram. According to some embodiments of the invention the image data represent off-axis hologram. According to some embodiments of the invention the image data represent generalized hologram.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 14A-L show experimental results obtained in an experiment performed to investigate the effect of focal length variations according to some exemplary embodiments of the present invention.

DESCRIPTION OF SPECIFIC EMBODIMENTS OF THE INVENTION

Figure 1:
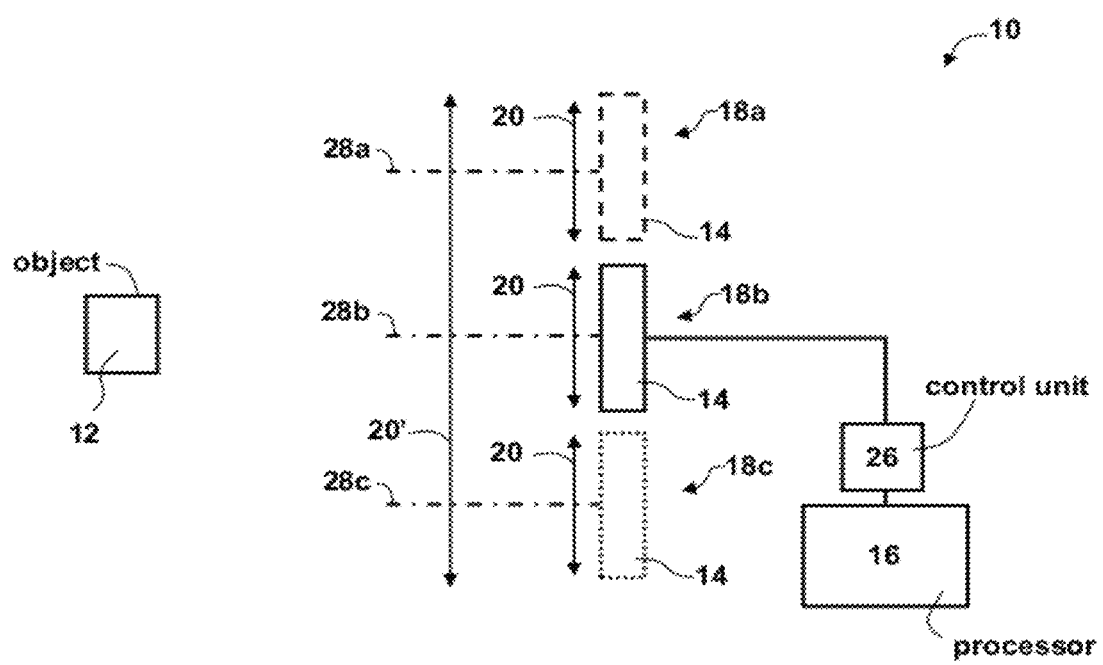
FIG. 1 is a schematic illustration of a system for generating a hologram of an object 12, according to various exemplary embodiments of the present invention.

The present invention, in some embodiments thereof, relates to imaging and, more particularly, but not exclusively, to holographic imaging.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a system 10 for generating a hologram of an object 12, according to various exemplary embodiments of the present invention.

System 10 comprises an optically passive synthetic aperture holographic apparatus 14 which acquires data corresponding to a plurality of incoherent sub-holograms, and a processor 16 which combines the sub-holograms to generate a mosaic hologram of object 12.

As used herein "optically passive" refers to a device, apparatus or system which does not irradiate the object in order to acquire holographic data therefrom.

As used herein "synthetic aperture holographic apparatus" refers to an apparatus arranged to acquire incoherent holographic data describing a plurality of different views, wherein for each view the holographic data is acquired and recorded independently of acquisitions for other views.

Synthetic aperture holography is particularly useful for cases where the angular spectrum of the electromagnetic radiation emitted from the object is wider than the physical aperture of the apparatus.

As used herein the term "hologram" refers to an image that encodes both the magnitude and phase of an electromagnetic wave arriving from an object, and the term "holographic data" refers to information which is sufficient to form a hologram. From the magnitude and phase of the electromagnetic wave, two- and three-dimensional spatial information regarding the shape of the object can be extracted or displayed. The image can be a two-dimensional image in which case the image is said to be a "two-dimensional hologram" or a three-dimensional image in which case the image is said to be a "volumetric hologram." The term "hologram" collectively refers to two-dimensional and volumetric holograms.

As used herein, an "image" refers to a plurality of gridwise arranged picture-elements (e.g., pixels, arrangements of pixels) treated collectively as an array. The imagery information is digital, namely in a form of discrete magnitude and phase values associated with the picture-elements, such that each picture-element is associated with a magnitude value and a phase value. Thus, the term "image" as used herein can include an array of values stored in a computer readable medium, and does not necessarily corresponds to a physical image, although the array certainly does correspond to a displayable physical image.

As used herein "incoherent holographic data" refer to data acquired from incoherent electromagnetic waves which are combinable to produce a hologram or a sub-hologram. Incoherent electromagnetic waves are electromagnetic waves having non-constant phase relation. Techniques for acquiring non-coherent holographic data are disclosed in International Patent Publication Nos. WO 2008/010790 and WO 2008/094141, the contents of which are hereby incorporated by reference.

Each acquisition of the synthetic aperture holographic apparatus is through a physical aperture of given dimensions 20. Since acquisitions are performed from several views, the combination of data from several such acquisitions is equivalent to a single acquisition that would have been realized had the aperture been of larger dimensions 20'. Thus, a virtual synthesis of several physical apertures defines an aperture having dimensions 20' which are larger than the dimensions 20 of each individual physical aperture. Such aperture is referred to herein as a "synthetic aperture."

The term "view" as used herein in the context of holographic data acquisition, refers to the location and size of a scene which is detectable by the physical aperture of the acquisition device (e.g., camera) during data acquisition. For a given size of physical aperture, the location and size of a scene is dictated by the position and orientation of the physical aperture.

Thus, two views are said to be "different" if obtained for different orientations of the physical aperture at the same position, different positions of the physical aperture at the same orientation, or different orientations and different positions of the physical aperture.

The position (also referred to as location) and orientation of a particular object are collectively referred to herein as the "pose" of the object.

The view provided by apparatus 14 can be conveniently characterized by a viewing axis and an angular span. The viewing axis is defined as a straight line passing at and perpendicularly to the center of the physical aperture of apparatus 14. While the angular span is dictated by the properties (e.g., shape, surface area) of the physical aperture, the viewing axis depends on the pose of the physical aperture.

In the context of the present embodiments, two views are said to be different if they are characterized by non-collinear viewing axes.

FIG. 1 shows three possible views characterized by three different (non-collinear) viewing axes 28a, 28b and 28c, respectively corresponding to positions 18a, 18b and 18c of apparatus 14. However, this need not necessarily be the case, since for some applications, it may be desired to employ a different number (e.g., larger than 3) of views. Furthermore although the positions are shown along a single straight line, this need not necessarily be the case, since the positions may be arranged differently. For example, the positions may be arranged in a (planar or non-planar) two-dimensional arrangement, e.g., forming a rectangular grid. Still further, although the viewing axes 28a, 28b and 28c are shown parallel to each other, this need not necessarily be the case, since in some embodiments the viewing axes are not parallel. For example, two or more viewing axes can correspond to the same position but different orientations of apparatus 14.

The synthetic aperture property of apparatus 14 can therefore be realized in more than one way.

In some embodiments, apparatus 14 or at least part of apparatus 14 is movable from one pose to the other, and in some embodiments apparatus 14 includes several units each having a different pose.

In the illustration of FIG. 1, for example, the current position of apparatus 14 is shown by solid line and positions which apparatus 14 can assume by moving from one position to the other are illustrated as dashed and dotted lines. Apparatus 14 can assume a different pose by translation motion, rotation motion or combination of translation and rotation motions. Alternatively, the solid, dashed and dotted lines in FIG. 1 can represent three different units at three different positions. Also contemplated are embodiments which apparatus 14 includes two or more movable units.

Aside from processing the data received from apparatus 14, processor 16 preferably also serves for controlling the operation of apparatus 14, e.g., via a control unit 26. The operation of processor 16 can be better understood with reference to FIGS. 2A-C.

Figure 2A:
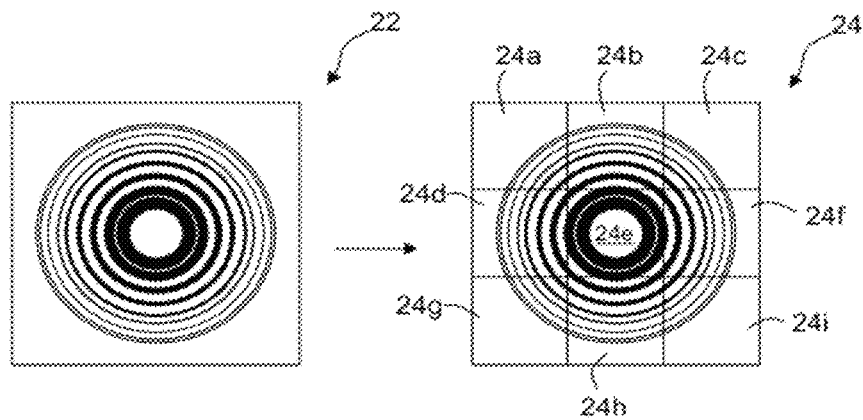
FIGS. 2A-C are schematic illustrations of modulation patterns and sub-patterns, according to some exemplary embodiments of the present invention.
Figure 2B:
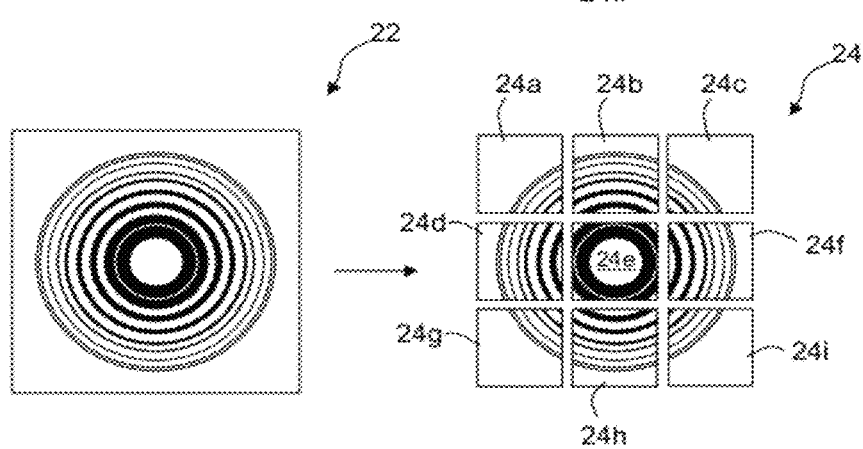

Processor 16 preferably receives an input wave modulation pattern 22 and defines a plurality of sub-patterns. Nine such sub-patterns are shown in FIGS. 2A-B, designated by reference signs 24a through 24i, but it is to be understood that it is not to intended to limit the scope of the present invention to 9 sub-patterns. Each of the sub-patterns that is defined by processor 16 corresponds to one view from which apparatus 14 acquires the data, such that the alignment of the sub-patterns according to the views form a mosaic pattern 24 which corresponds to modulation pattern 22. The dimensions of each sub-pattern are selected to match the dimension of the physical aperture of apparatus 14 and the dimensions of mosaic pattern 24 are selected to match the desired dimensions of the synthetic aperture. As further explained below, the sum of areas of all sub-patterns can be smaller than, larger than or equal the area of pattern 22.

Pattern 22 may be any pattern that can act as a beam splitter or a beam splitter and a beam shaper. Representative examples include, without limitation, a single Fresnel Zone Pattern (FZP), double FZP, FZP with dispersed or randomly located constant phase values or elements, a random phase element mask, a random phase element mask with dispersed or randomly located constant phase values or elements, and the like.

As used herein, an FZP is a two-dimensional pattern of alternating light and dark concentric rings in which the radial width of successive rings is decreases with the distance from the center of the rings. For example, the nth ring of an FZP may transition (i.e., from dark to light or light to dark) at a radius r described by the following equation (or by an approximation thereof): $r_n = \sqrt{nf\lambda}$ where n is an integer, $\lambda$ is the wavelength of the electromagnetic wave and f is the focal length of the FZP.

Optionally, but not necessarily, the FZP is a binary FZP wherein each zone includes only one of two transmissive states: substantially transparent (e.g., transmits more than 90% of the radiation), and substantially opaque (e.g., absorbs or reflects more than 90% of the radiation). It is to be understood that the invention is not limited to binary FZPs having alternating zones of more than 90% transmission and more than 90% absorption or reflection, but also includes FZPs having other levels of transmission, and absorption or reflection, as known in the field of FZPs. Further, the invention is not limited to FZPs having zones having a consistent transmission levels throughout each zone, but also includes FZPs having zones with varying transmission levels within each zone. In addition, the invention is not limited only to patterns of complete circular rings, but also includes patterns of partial rings, such as an off-axis FZP. Also contemplated, is the use of arbitrary real valued functions instead of FZP, e.g., as described in International Patent Publication Nos. WO 2008/010790 and WO 2008/094141, the contents of which are hereby incorporated by reference.

Generally, pattern 22 features masks that allow it to split and/or shape the incoming electromagnetic wave. For example, the masks can be selected such that modulation of an incoming electromagnetic radiation according to pattern 22 effectively generates two spherical outgoing beams with two different curve radii. Any combination of mask can be employed. Thus, in some embodiments, pattern 22 features phase-only masks, and in some embodiment pattern 22 features phase masks and magnitude masks. The phase masks can be either real value phase masks or complex value phase masks. In some embodiments of the present invention pattern 22 includes a constant phase mask for generating one beam and a non-constant phase mask for generating another beam. Representative phase mask examples are provided in the Examples section that follows.

Processor 16 transmits data pertaining to the sub-patterns and the respective views to apparatus 14, preferably sequentially. For each view, apparatus 14 assumes a pose to establish a viewing axis corresponding to that view, by moving to a different position, by rotating or by activating a different acquisition unit. Apparatus 14 then modulates the electromagnetic radiation according to the respective sub-pattern to record image data associated with that view.

Alternatively, processor 16 can transmit the sub-patterns and view-points data to control unit 26 which, based on the data, controls the pose and optionally also the modulation of apparatus 14.

Figure 2C:
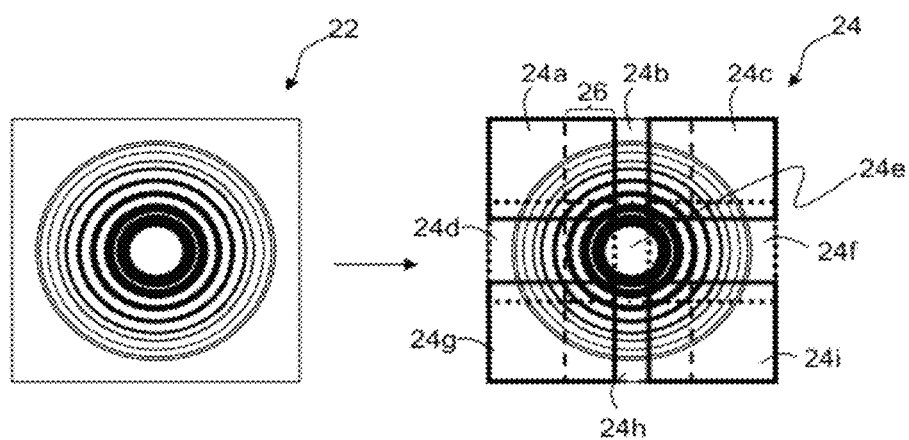

FIG. 2A represents an embodiment in which mosaic pattern 24 is continuous, whereby the individual sub-patterns are tiled substantially without gaps between adjacent sub-patterns. In this embodiment, mosaic pattern 24 is substantially the same (e.g., with deviation of less than 10%) as input modulation pattern 22. FIG. 2B represents an embodiment in which mosaic pattern 24 is discontinuous, whereby the individual sub-patterns are tiled such that there is a gap between at least two adjacent sub-patterns. In this embodiment mosaic pattern 24 is an approximation of input modulation pattern 22. Also contemplated are embodiments in which there are some overlaps between adjacent sub-patterns. A representative example of these embodiments is illustrated in FIG. 2C. One of the overlaps is shown at 26.

The embodiment shown in FIG. 2A is preferred from the stand point of accuracy, and the embodiment shown in FIG. 2B is preferred from the stand point of cost and availability and from practical considerations (such as overall acquisition time, etc.) since a smaller physical aperture can be employed for given dimensions of the synthetic aperture and a given number of sub-patterns.

Before providing a further detailed description of some embodiment of the present invention, attention will be given to the advantages and potential applications offered thereby.

One advantage of the present embodiments is that the hologram may be obtained without an active light source to illuminate the object or project a pattern thereon, such as is done in a conventional or scanning holographic method. Active solutions that require illumination of the object by a particular light source may limit the applicability and usefulness of the conventional holography systems. For example, an active light source would not be applicable in holographic systems that observe far objects or objects that produce their own light, such as a holographic system observing chemiluminescent light, fluorescent light, black body radiation, or infrared illuminating objects.

Another advantage of the present embodiments is that the generation of hologram does not require interference between light from the illumination and light scattered by the object. The technique of the present embodiments modulate the electromagnetic radiation received from the object, which may be understood as a mutual interference between portions of electromagnetic radiation wavefronts coming from object itself, and is not an interference between such scattered light and another light from the source. The mutual interference may be performed by one or a relatively small number of collinear elements (on-axis holography). This embodiment is advantageous since the relative differences between optical paths of the interfering object waves are easily controlled and therefore variations between the lengths of the paths may be more easily controlled and minimized.

An additional advantage of the technique of present embodiments is that it employs an extended synthetic aperture, which improves the transverse and axial resolutions beyond the theoretical Rayleigh limit dictated by the size of the physical aperture. In some embodiments of the present invention, the hologram is acquired from electromagnetic radiation at a wavelength which is in or below the infrared domain (e.g., infrared domain, ultraviolet domain, X-ray domain). This is advantageous over conventional synthetic aperture techniques, such as Very Long Baseline Interferometer and Synthetic Aperture Radar which operate only at relatively long wavelengths. The use of short wavelengths according to some embodiments of the present invention facilitates higher resolution. In some embodiments of the present invention the area of the synthetic aperture is more than 1 square kilometer, or more than 10 square kilometers or more than 100 square kilometers or more than 1,000 square kilometers or more than 10,000 square kilometers. This is advantageous over conventional short wavelengths synthetic aperture techniques such as the Michelson stellar interferometer in which the synthetic aperture dimension cannot be extended beyond few hundreds meters to ensure real-time synchronization between the different units. Specifically, in Michelson stellar interferometer optical interference between different light samples that are collected at different special units located at the synthetic aperture of the interferometer at the same time cannot be ensured in distances of more then few hundreds of meters on the ground and much shorter distances in the extraterrestrial space due to communication constrains and other practical constrains. An additional advantage of the technique of present embodiments is that unlike ground-based Michelson stellar interferometer the present embodiments can be utilized in the extraterrestrial space and can therefore exploit the entire regime of electromagnetic radiation without considering atmospheric filtration.

The technique of the present embodiments can be employed in various applications, including, without limitation, remote sensing, spectral imaging, hyper-spectral imaging, three-dimensional imaging, pattern recognition, target acquisition, object identification, microscopy, X-ray imaging and any type of medical imaging including computerized tomography, intracorporeal imaging and extracorporeal imaging. The technique of the present embodiments is particularly advantageous in applications which require resolution that is higher than the available resolution in the optical regime.

Figure 3:
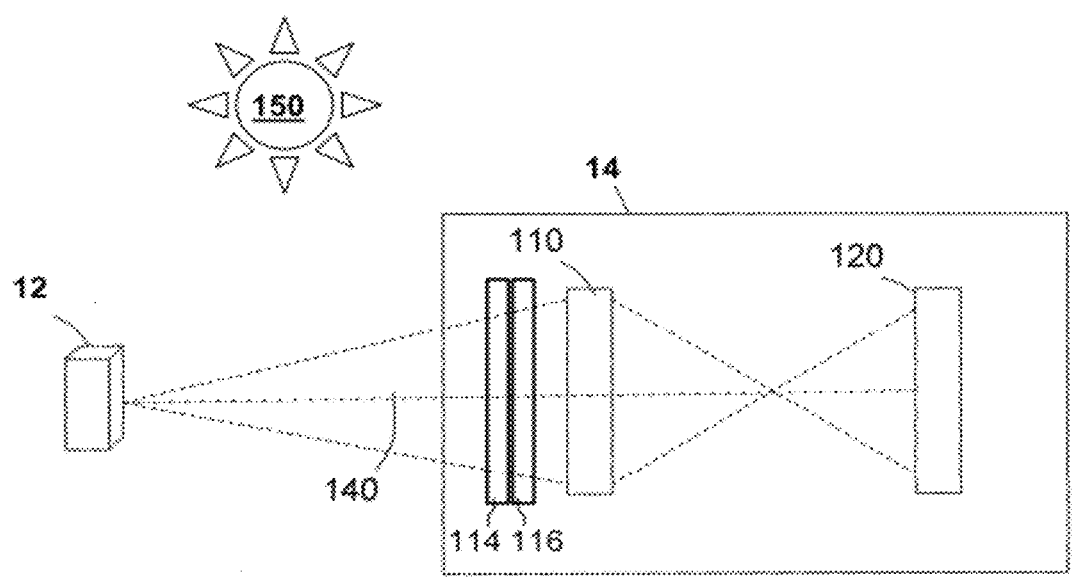
FIG. 3 is a schematic illustration of an optically passive holographic apparatus according to some exemplary embodiments of the present invention.

Reference is now made to FIG. 3 which is a schematic illustration of holographic apparatus 14 according to some embodiments of the present invention. Apparatus 14 comprises a wave modulator 110 and a recorder assembly 120. Optionally and preferably apparatus 14 comprises an element 114 that provides quasi-monochromatic electromagnetic wave, such as, but not limited to, a filtering element e.g., a band pass filter, and a monochromator element.

As used herein, "quasi-monochromatic electromagnetic wave" refers to an electromagnetic wave having a plurality of frequencies in a range of frequencies characterized by a central frequency $\omega_0$ and a bandwidth $\Delta\omega$, where the bandwidth is substantially lower than the central frequency (e.g., $0.001 \leq \Delta\omega/\omega_0 \leq 0.36$). The central frequency of the quasi-monochromatic electromagnetic wave can be any frequency from the electromagnetic spectrum, preferably the optical domain of the electromagnetic spectrum.

Wave modulator 110 receives an incoherent electromagnetic radiation from the object 12 along a receiving axis 140. For example, the wave modulator may receive electromagnetic radiation from the sun 150 that is reflected, scattered by reflecting surfaces on the object 12, or transmitted through object 12. The electromagnetic radiation can also be emitted from the object. For example, the object can emit black body radiation, or it can be a chemiluminescent or fluorescent object or surface that emits chemiluminescent or fluorescent light.

The electromagnetic radiation can be of any wavelength, including a multiplicity of wavelengths from the optical regime of the electromagnetic spectrum, from the extreme infra red domain to the gamma domain, inclusive. In some embodiments of the present invention the wavelength of the electromagnetic radiation is from the microwave domain to the X-ray domain. In some embodiments of the present invention the wavelength of the electromagnetic radiation is from the infrared domain to the X-ray domain. Thus, the present embodiments contemplate electromagnetic radiation which is an infrared light, a visible light, an ultraviolet light or an X-ray radiation. Representative examples of wavelengths suitable for the present invention include, without limitation, any wavelength from $10^{-10}$ m to $10^{-2}$ m.

Wave modulator 110 modulate the received electromagnetic radiation according to a modulation pattern or a modulation sub-pattern, such as, but not limited to, one of sub-patterns 24a through 24i described above, and transmits modulated electromagnetic waves in a beam defined by axis 140. Recorder 120 receives the modulated electromagnetic waves from modulator 110, and records an intensity image of the modulated waves. The recorded intensity image includes magnitude and phase of the incoming radiation received at wave modulator 110 from which the three-dimensional or geometric information regarding the respective portions of object 12 can be extracted.

Band pass filter 114 serves for filtering the incoming electromagnetic radiation such as to provide modulator 110 with a quasi-monochromatic radiation. Reducing the bandwidth of the filter improves the contrast of the fringes and improves the hologram quality as long as the signal is higher then the noise at filter 114, modulator 110 and recorder 120. For example, for visible light, a filter 114 having a bandwidth of less than 200 nm (e.g., about 50 nm) can be employed. One of ordinary skill in the art would know how to select the bandwidth and central wavelength of filter 114 for other optical domains (infrared, ultraviolet, X-ray).

In conventional coherent holographic systems the optical path differences of the object wave and reference waves has to be smaller then the coherence length of the illuminating/illuminated source so as order to get or create an interference between the two waves on the imager. The combination of on-axis holography, use of band pass filter and relatively short distance between the components of system 10, according to some exemplary embodiments is advantageous over conventional system since it allows keeping the path differences shorter then the coherence length.

In some embodiments of the present invention apparatus 14 comprises a polarizer 116. Polarizer 116 serves for polarizing the electromagnetic radiation such as to provide modulator 110 with polarized radiation. The polarizer can improve the functionality of modulator 110 hence also the contrast of the fringes. In some embodiments, however, a polarizer is not required.

Wave modulator 110 can comprise any electromagnetic assembly which is configured to control a complex amplitude of the incoming electromagnetic radiation according to the complex transformation function described below. Broadly speaking, modulator 110 is used as a diffractive beam splitter such that each spherical electromagnetic wave originated from each object point, is split into two spherical beams with two different curve radii. Accumulation of the entire interferences within all of the couples of spherical beams creates the Fresnel hologram.

Many types of modulators are contemplated. Representative examples include, without limitation, one or more refractive lenses, one or more diffractive optical elements (DOEs) and/or one or more spatial light modulators (SLMs).

For example, when modulator 110 comprises an SLM, modulation can be set, or programmed, onto the SLM by either optical or electric addressing. In optical addressing, the modulation at a specific pixel on the SLM is controlled by the intensity of light at that location. In electrical addressing, control voltages are varied at the local pixel sites. The SLM can employ voltage-dependent birefringence of liquid crystals to perform amplitude modulation and/or phase modulation and/or complex modulation. Amplitude modulation is performed by using birefringence to rotate the polarization of light. A polarizer can convert the polarization modulation into amplitude modulation. Phase modulation is performed by aligning the polarization of incident light along one of the two principal axes describing the refractive index of the crystal. The amount of phase shift is determined by the voltage-dependent change in the velocity of the optical wave in the crystal.

A digital micro-mirror device (DMD) can also be employed as an SLM. A DMD has an array of micro-mechanical display elements, each having a tiny mirror that is individually addressable with an electronic signal. Depending on the state of its addressing signal, each mirror tilts at a predetermined angle so vary the direction of the reflected light.

In various exemplary embodiments of the invention a phase-only SLM is employed. Also contemplated are embodiments in which an amplitude-only SLM are employed, and embodiments in which a complex SLM are employed.

It is expected that during the life of a patent maturing from this application many relevant electromagnetic modulation techniques will be developed and the scope of the term electromagnetic modulator is intended to include all such new technologies a priori.

Recorder 120 may be an opaque capturing device. An opaque device is understood to mean a device that is not transparent or translucent to electromagnetic radiation of relevant frequencies and intensities, and therefore such a device does not allow such electromagnetic radiation to pass through. For example, recorder 120 can comprise a charge coupled device (CCD), a Metal Oxide Semiconductor (MOS) type imager, a Complementary MOS (CMOS) imager and the like.

In some embodiments, the recorded intensity image can be a two-dimensional image or a three-dimensional image, as desired. In any event, the recorded intensity image encodes three-dimensional or geometric information or phase and amplitude of the incoming object light wave.

The three-dimensional or geometric information is, in some embodiments of the present invention, encoded in the recorded intensity image as a Fresnel hologram. A Fresnel hologram is a real positive light intensity distribution that encodes a complex valued wavefront distribution, including three-dimensional information regarding the wave scattering surface of the object. In a Fresnel hologram, each point on the object is encoded into a portion of a sinusoidal Fresnel zone plate with an entire range of spatial frequency components present (see, e.g., Goodman, "Introduction to Fourier Optics," 3rd Ed., Roberts & Company Publishers, 2005, incorporated herein by reference). A three-dimensional image of the object may be reconstructed either optically by appropriately illuminating a transparency having the Fresnel hologram, or computationally by a data processor which receives digital data of the Fresnel hologram and generates a digital Fresnel hologram over a system of coordinates.

Also contemplated are embodiments in which other type of holograms are employed. Representative examples include, without limitation, a digital hologram, a non-digital hologram, a Fourier hologram, an image hologram, an on-axis hologram, an off-axis hologram, as known in the art.

Further contemplated are embodiments in which the three-dimensional or geometric information is encoded in the recorded intensity image as a generalized hologram.

As used herein, a generalized hologram is a hologram that is obtained using a modulation pattern featuring masks in the form of general broadband spatial functions. A representative of such a mask is, without limitation, a random distributed and random valued phase mask.

A generalized hologram is advantageous, for example, when it is desired to have a hologram with encryption and/or sectioning properties.

Any of the aforementioned types of holograms includes information pertaining the magnitude and phase of the incoming radiation, from which an image encoding three-dimensional information regarding the shape and optionally distance of an observable surface of the object can be reconstructed. Computation techniques for reconstructing three-dimensional image of the object are found in International Patent Publication Nos. WO 2008/010790 and WO 2008/094141, the contents of which are hereby incorporated by reference.

Figure 4:
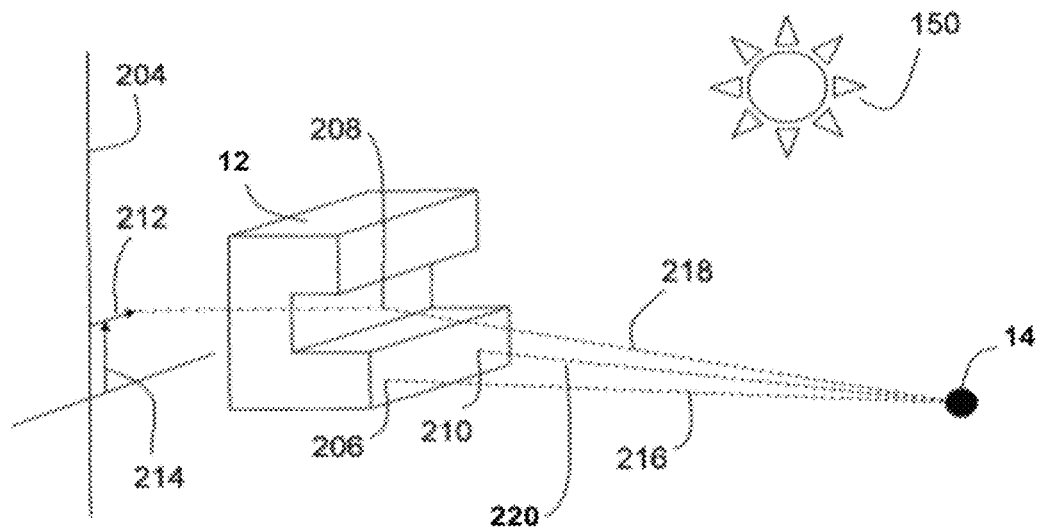
FIG. 4 is a schematic illustration of an example of the geometric information encoded in a recorded image according to some exemplary embodiments of the present invention.

FIG. 4 is a schematic illustration of an example of the geometric information encoded in the recorded image according to some embodiments of the present invention. According to the example of FIG. 4, object 12 is illuminated by an electromagnetic radiation (e.g., sun 150) causing the electromagnetic radiation to be scattered or reflected by various portions of object 12.

While the embodiments below are described with a particular emphasis to an electromagnetic radiation which is light, it is to be understood that more detailed reference to light is not to be interpreted as limiting the scope of the invention in any way.

In FIG. 4 portions 206, 208 and 210 of object 12 respectively scatter or reflect light rays 216, 218 and 220. Light rays 216, 218 and 220 travel towards apparatus 14 (generally shown as a bulb in FIG. 4). Light captured by apparatus 14, according to some embodiments of the present invention, includes geometric information regarding the shape of observable surfaces of object 12 from which light is received at apparatus 14. The captured light can include geometric information regarding transverse distances of portion 208, for example, a horizontal distance 212 between an edge of object 12 and portion 208 and/or a vertical distance 214 between an edge of object 12 and portion 208. In this example, horizontal distance 212 and vertical distance 214 are distances measured in a measurement plane 204 that passes through portion 208. The light also includes information regarding the difference between the optical paths of the various light rays (e.g., rays 216, 218 and 220).

In various exemplary embodiments of the invention apparatus 14 is configured to capture the light including the geometric information regarding each portion of object 12. From the geometric information carried by the light, the size, shape and relative location of the visible portions of object 12 may be determined. In some embodiments of the present invention the distance or distances between one or more portions of object 12 and apparatus 14 is also determined. For example, the distance between portion 208 and apparatus 14 can be determined based on information regarding a distance traveled by ray 218.

Although light is scattered by external surfaces in FIG. 4, one of skill in the art will understand that apparatus 14 is also capable of capturing received light from an internal surface of object 12 that radiates light to apparatus 14 through a translucent or transparent exterior portion of object 12. In that case, the captured geometric information may include geometric information regarding an interior portion of object 12.

It is appreciated that the Fresnel hologram may be in focus for one cross-section or object focal plane of the object, and out of focus for other portions of the object that are in front of or behind the cross-section that is in the object focal plane.

Accordingly, the present embodiments provide a technique for extracting information from the desired in-focus cross-section by taking advantage of differences between the patterns in that plane arid in other planes. Points on the desired cross-section plane create a composition of Fresnel zone plates each contributed from an object point on the specific cross-section plane of the object. Points from other than the specific cross-section plane contribute noisy patterns that may be accumulated in the image sensor, and the noisy patterns may be removed from the image data. For example, for each pose of apparatus 14 or its physical aperture, processor 16 can signal apparatus 14 to record a set of images each with a different phase factor. In various exemplary embodiments of the invention the set includes three images, referred to herein as an image triplet, captured with three different phase factors, denoted $\phi_1$, $\phi_2$ and $\phi_3$. The phase factors can satisfy predetermined criteria, e.g., $\phi_1+\phi_2+\phi_3=2\pi$, and $\phi_1-\phi_2=\phi_2-\phi_3$. For example, a first image in the triplet can be characterized by a first phase factor $\phi_1=0$, a second image in the triplet can be characterized by a second phase factor $\phi_2=2\pi/3$, and a third image in the triplet can be characterized by a third phase factor $\phi_3=4\pi/3$.

Processor 16 can then perform a superposition of the captured images to provide a Fresnel hologram which advantageously only contains information about a visible portion of the object that intersects a specific cross-section plane of the object space.

According to the theory of on-axis holography, holographic data acquired using a single phase factor is typically expressed using three components referred to as a real image component, a twin image component and a bias component. The use of three captured images allows extracting the real image component and suppressing or completely eliminating the twin image and bias components from the acquired data.

It is expected that during the life of a patent maturing from this application many relevant holography techniques will be developed, which techniques will allow suppressing the twin image and bias components using less than three images. The scope of the present invention is intended to include all such new technologies a priori.

In some embodiments of the present invention processor 16 signals apparatus 14 to record a plurality of sets of images where each image in the set includes images recoded with different phase factors. For example, a plurality of image triplets can be recorded where each triplet includes a first image or hologram characterized by phase factor $\phi_1$, a second image or hologram characterized by phase factor $\phi_2$, and a third image or hologram characterized by phase factor $\phi_3$.

Processor 16 preferably processes each set (triplet in the present example) to extract the real image data associated with the set. Once all the images are captured processor 16 can average the respective real image data over the sets. This allows reduction of noise since noise components which are essentially random are cancelled during the averaging. Thus, the present embodiments provide averaged real image data characterized by a signal-to-noise ratio which is higher than the signal-to-noise ratio of real image data of a single set. It is estimated that when the number of sets is $X^2$, the signal-to-noise ratio is improved approximately by a factor of X.

Figure 5:
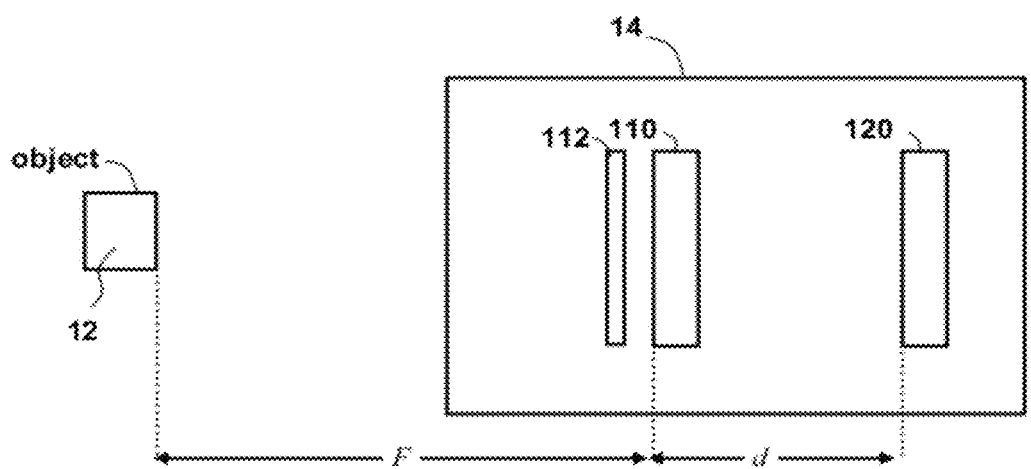
FIG. 5 is a schematic illustration of an optically passive holographic apparatus is an embodiment in which the apparatus comprises a collimator, according to some exemplary embodiments of the present invention.

FIG. 5 is a schematic illustration of apparatus 14 is an embodiment in which apparatus 14 comprises a collimator 112 for collimating the electromagnetic radiation prior to or during the modulation. Thus, collimator 112 is typically positioned between modulator 110 and object 12 or on modulator 110. For clarity of presentation, band pass filter 114 and polarizer 116 are not shown in FIG. 5. In embodiments in which filter 114 and/or polarizer 116 are employed, they can be positioned anywhere between modulator 110 and object 12 in any combination.

The focal length F of collimator 112 is preferably selected such that the electromagnetic radiation exits object 12 and arrives at modulator 110 is the form of a plane wave. In this embodiment, the distance from object 12 is known, at least approximately in advance, and the focal length of collimator 112 as selected equal to the distance from object 12 and collimator 112.

In various exemplary embodiments of the invention modulator 110 is at a distance d from recorder 120, where d is from about 0.5 F to about 1.5 F. It was found by the present inventors that such construction of apparatus 14 facilitate a linear relation between the dimensions 20' of the synthetic aperture and the obtainable resolution. Specifically, the present inventors found that with such construction, a synthetic aperture with a linear dimension which is X times larger than the linear dimension of the physical aperture provides a hologram in which the minimal resolvable distance along the same dimension is X times smaller than the minimal resolvable distance that would have obtained using the physical aperture. This is an improvement of conventional techniques in which the relation between the dimensions of the synthetic aperture and the obtainable resolution is less than linear (e.g., logarithmic or even constant).

Collimator 112 can be of any type. For example, collimator 112 can be a converging lens (spherical or non spherical), an arrangement of lenses and the like. Collimator 112 can also be a diffractive optical element, which may be spaced apart, carried by or formed on modulator 110. A diffractive collimator may be positioned either on the entry surface of modulator 110, as a transmissive diffractive element or on the opposite surface as a reflective diffractive element. When a diffractive collimator is carried by or formed on modulator 110, the effective pattern or sub-pattern of modulator 110 is preferably a multiplication result of the desired modulation and the desired collimation. Thus, in this embodiment, the collimation of the incoming wave is controlled digitally, for example, by processor 16.

Figure 6:
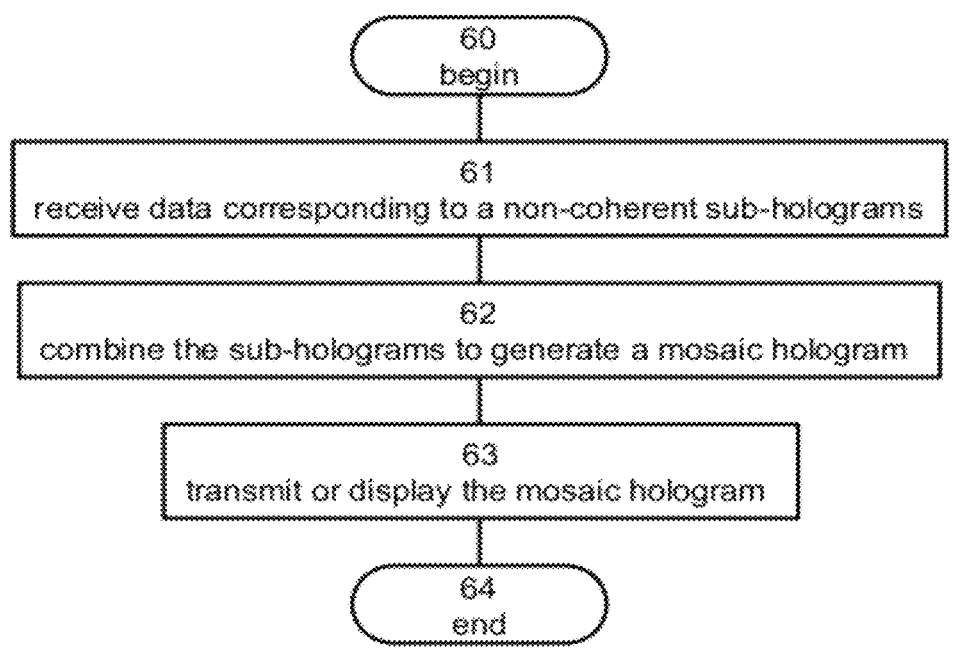
FIG. 6 is a flowchart diagram of a method suitable for generating a hologram of an object, according to various exemplary embodiments of the present invention.
Figure 7:
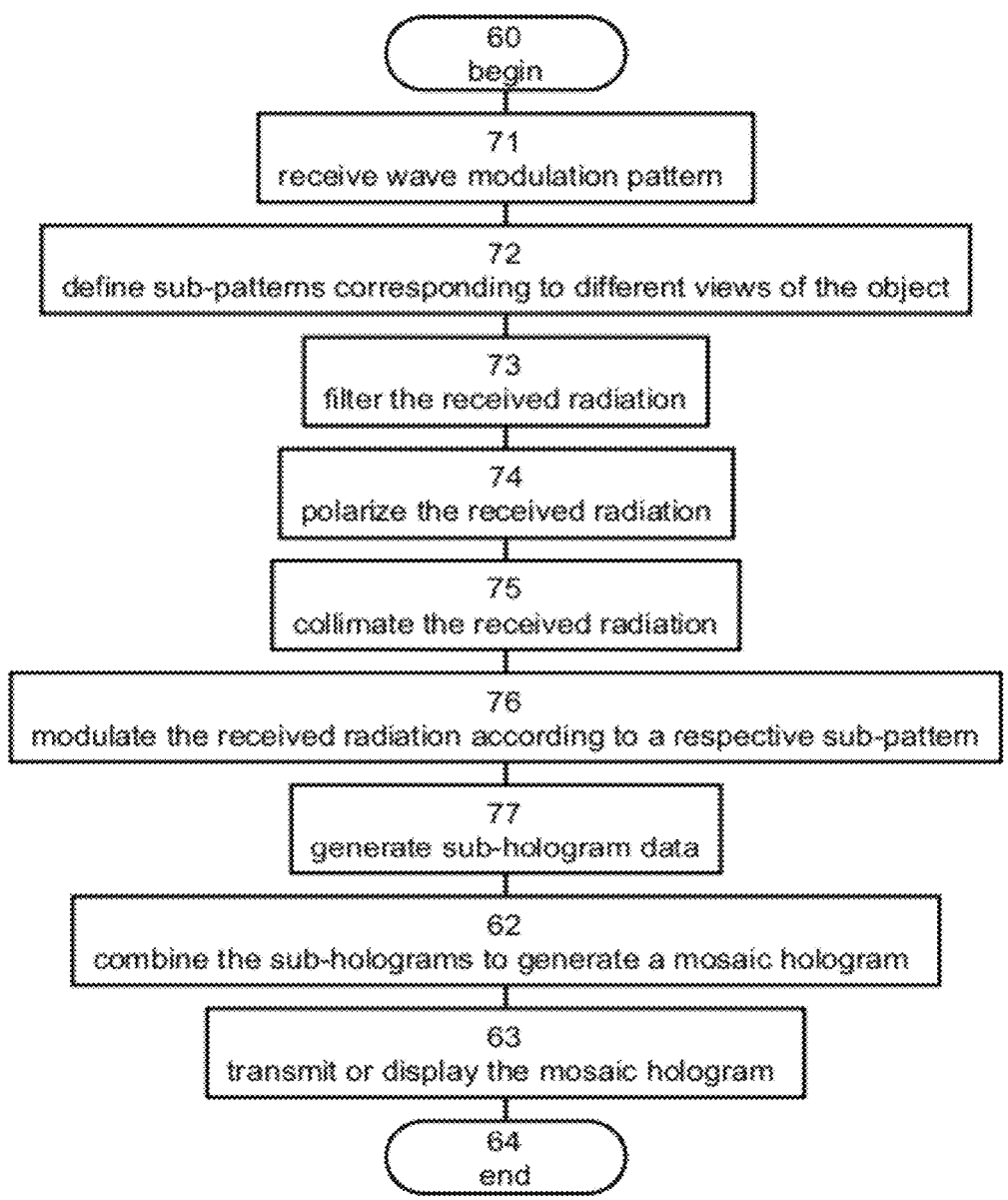
FIG. 7 is a flowchart diagram of a method suitable for generating a hologram of an object, in an embodiment of the invention in which the method also generates sub-hologram data.

Reference is now made to FIGS. 6 and 7 which are flowchart diagrams of a method suitable for generating a hologram of an object, according to various exemplary embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by one or more elements of system 10 described above. For example, selected operations of the method can be executed by a processor such as processor 16, and selected operations of the method can be executed by an optically passive synthetic aperture holographic apparatus such as apparatus 14.

Selected operations of the method can be embodied in many forms. For example, it can be embodied in on a tangible medium such as a computer for performing the method steps. It can be embodied on a computer readable medium, comprising computer readable instructions for carrying out the method steps. In can also be embodied in electronic device having digital computer capabilities arranged to run the computer program on the tangible medium or execute the instruction on a computer readable medium Computer programs implementing the method of the present embodiments can commonly be distributed to users on a distribution medium such as, but not limited to, a floppy disk, CD-ROM or flash memory cards. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

Referring to FIG. 6, the method begins at 60 and continues to 61 at which data corresponding to a plurality of non-coherent sub-holograms acquired by an optically passive synthetic aperture holographic apparatus as further detailed hereinabove are received. The data can be input to the method from an external source such as a memory medium or an acquisition device or it can be generated by the method. A preferred embodiment for generating the data is described hereinbelow with reference to FIG. 7. The method continues to 62 at which the sub-holograms are combined, for example, by a data processor to generate a mosaic hologram of the object, as further detailed hereinabove. The method continues to 63 at which the mosaic hologram is transmitted to a computer readable medium or displayed using a display device.

The method ends at 64.

FIG. 7 is a flowchart diagram of the method in embodiments in which the method generates the sub-hologram data. In this embodiment, the method begins at 70 and continues to 71 at which a wave modulation pattern is received, and 72 at which a plurality of sub-patterns respectively corresponding to a plurality of views are defined as further detailed hereinabove. Optionally and preferably the method continues to 73 at which electromagnetic radiation arriving from the object is filtered to provide a quasi-monochromatic radiation. In some optional embodiments, the method continues to 74 at which the radiation is polarized. At 75 electromagnetic radiation is optionally and preferably collimated using a collimator, as further detailed hereinabove.

The method continues to 76 at which for each view the method collects the electromagnetic radiation and modulates the radiation according to a respective sub-pattern to record image data associated with the view. At 77 the method processes the recorded image data of each view to provide data corresponding to a sub-hologram associated with that view.

The method then continues to 62 at which at which the sub-holograms are combined, for example, by a data processor to generate a mosaic hologram of the object, and 63 at which the mosaic hologram is transmitted to a computer readable medium or displayed using a display device.

The method end at 64.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Optically Passive Synthetic Aperture Holography

Experiments were made to produce holograms were generated from passively collected incoherent light using a synthetic aperture with Fresnel elements (SAFE).

Description of the Experimental System

Figure 8:
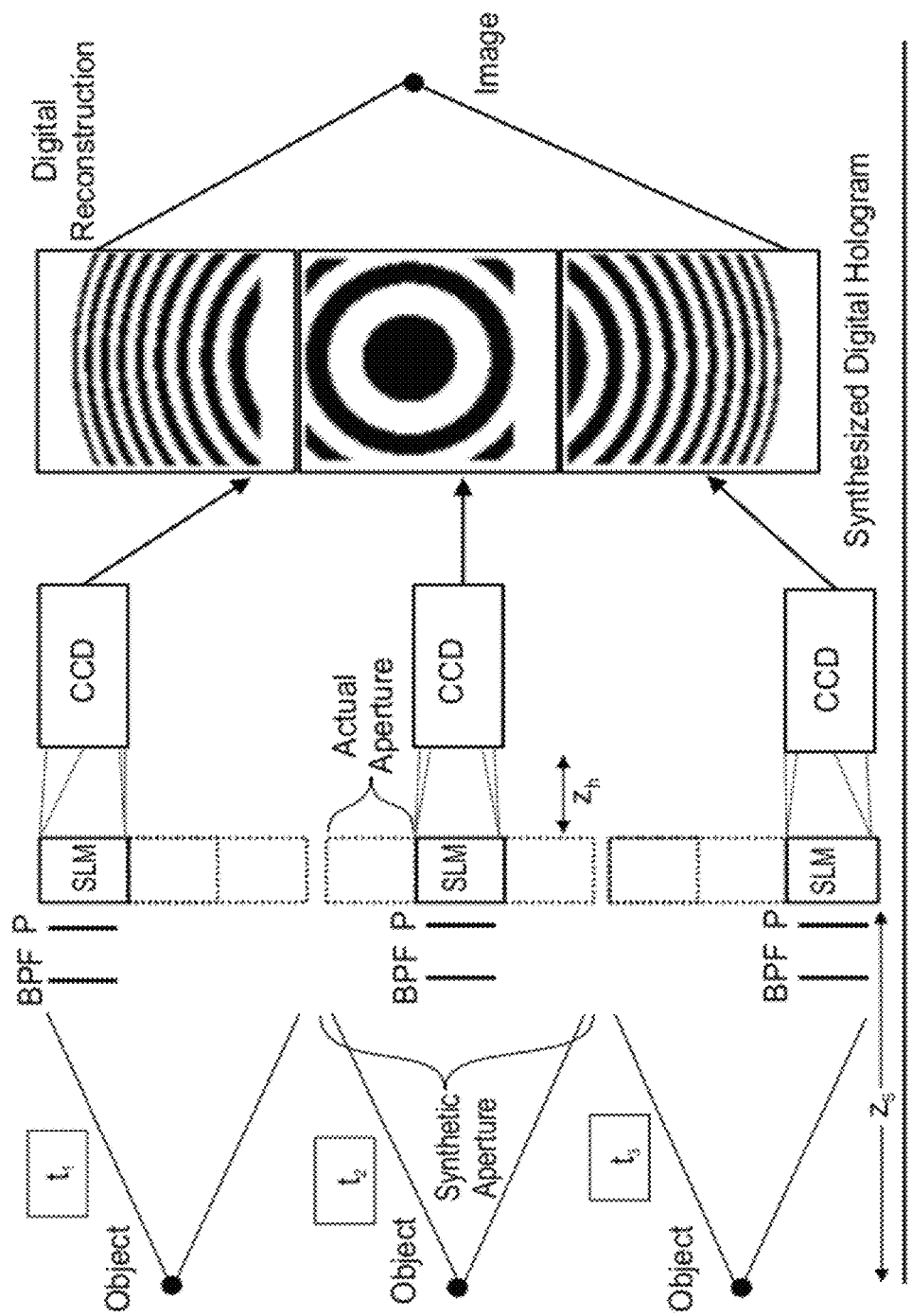
FIG. 8 is a schematic illustration of a prototype system used in experiments performed according to some exemplary embodiments of the present invention.

A prototype holographic system containing a BPF (bandwidth 80 nm, central wavelength 550 nm), a polarizer, a SLM (Holoeye, PLUTO), a digital camera (E-VISION, EVC6600SAM-GE5) and a computer was used as the experimental setup (FIG. 8). The prototype system had an extended synthetic aperture in order to improve the transverse and axial resolutions beyond the classic limitations. The synthetic aperture was implemented by shifting the BPF-polarizer-SLM-camera set, located across the field of view, among several viewpoints, to provide different views of the object and to acquire the object wave, or object hologram, from different special locations. At each viewpoint a different modulation sub-pattern is displayed on the SLM, and a single Fresnel sub-hologram is recorded.

The various elements, each of which was recorded by the real aperture system during the capturing time, were tiled together so that a final mosaic hologram was obtained.

Theoretical Considerations

An example of a system with the synthetic aperture, which is three times wider than the actual aperture is illustrated in FIG. 8. Without loss of generality and in order to simplify the demonstration, the synthetic aperture was implemented only along the horizontal axis. In principle, this concept can be generalized for both the horizontal and vertical axes and for any ratio of synthetic to actual apertures.

In the prototype system illustrated in FIG. 8, the SLM and the digital camera move in front of the object. The real (physical) aperture of the system is $A_x \times A_y$ in size. The complete Fresnel hologram of the object, located at some distance from the SLM, is a mosaic of 3 sub-holograms, each of which is recorded from a different viewpoint by the system. In this example, the complete hologram tiled from the 3 holographic Fresnel elements has the synthetic aperture which is $3 \cdot A_x \times A_y$ in size, namely 3 times larger than the physical aperture at the horizontal axis. In the experiments described below, the size of the physical aperture of the system was 1500×1000 pixels and the size of the synthetic aperture was 3000×1000 pixels.

The following mathematical analysis is nevertheless for a more general case in which there are M×N sub-holograms arranged such that the synthetic aperture has an horizontal dimension of $M \cdot A_x$ and a vertical dimension of $N \cdot A_y$.

An object point located at the point $(x_s, y_s, z_s)$, at a distance $z_s$ from the SLM, induces on the SLM plane $(x,y)$ a tilted diverging spherical wave of the form of $C_1(x_s, y_s)Q[1/z_s]L[-x_s/z_s, -y_s/z_s]$.

For simplicity, a quadratic phase function Q ($Q[s]=\exp[i\pi s\lambda^{-1}(x^2+y^2)]$) and a linear phase function L ($L[s_x,s_y]=\exp[i2\pi\lambda^{-1}(s_x x+s_y y)]$) were selected, where the symbol [ ... ] denotes a greatest integer function, $\lambda$ is the average wavelength of the light and $C_1(x_s,y_s)$ is a complex constant dependent on the source point's location.

Each tilted diverging spherical wave in the (m,n)-th exposure is split into two waves by the SLM mask which is a sum of two aperture-limited quadratic phase functions of the form:

$$(C_2Q[-1/f_1]+C_3Q[-1/f_2])rect[(x-A_x\cdot m)/A_x,(y-A_y\cdot n)/A_y],$$

where $f_1,f_2$ are real constants indicating the two effective focal lengths of the diffractive pattern on the SLM, $C_{2,3}$ are complex constants and the function rect is defined as follows:

$$rect\left(\frac{x}{\alpha},\frac{y}{\beta}\right) \equiv \begin{cases} 1 & (|x|,|y|) \leq (\alpha/2,\beta/2) \\ 0 & \text{Otherwise.} \end{cases}$$

From the SLM plane the two waves propagate a distance $z_h$ until they are recorded by the digital camera. The complex amplitude on the camera plane $(x_o,y_o)$ is computed as a free-space propagation under Fresnel approximation or, in other words, as a convolution between the complex amplitude on the SLM and the function $Q[1/z_h]$. A complete Fresnel hologram of the object point located at $(x_s,y_s,z_s)$ is a sum of M×N holographic elements, each of which is the intensity recorded from the (m,n)-th location by the digital camera:

$$I_h(x_o,y_o;x_s,y_s,z_s) = \sum_{n=\frac{1-N}{2}}^{\frac{N-1}{2}} \sum_{m=\frac{1-M}{2}}^{\frac{M-1}{2}} \left| C_1(x_s,y_s)Q\left[\frac{1}{z_s}\right]L\left[\frac{-x_s}{z_s},\frac{-y_s}{z_s}\right] \times \left(C_2Q\left[\frac{-1}{f_1}\right]+C_3Q\left[\frac{-1}{f_2}\right]\right)rect\left(\frac{x-A_x\cdot m}{A_x},\frac{y-A_y\cdot n}{A_y}\right) * Q\left[\frac{1}{z_h}\right] \right|^2,$$
(EQ. 1.1)

where the asterisk operation denotes a two dimensional convolution. Without the loss of generality it is assumed that M and N are odd numbers. Following straightforward calculations (see Appendix 1 for details), the intensity distribution recorded by the digital camera is expressed as:

$$I_h(x_o,y_o;x_s,y_s,z_s) = \left(C_4 + C_5(x_s,y_s)Q\left[\frac{-1}{z_r}\right]L\left[\frac{-x_r}{z_r},\frac{-y_r}{z_r}\right] + C_5^*(x_s,y_s)Q\left[\frac{1}{z_r}\right]\times L\left[\frac{x_r}{z_r},\frac{y_r}{z_r}\right]\right) \sum_{n=\frac{1-N}{2}}^{\frac{N-1}{2}} \sum_{m=\frac{1-M}{2}}^{\frac{M-1}{2}} rect\left(\frac{x_r-A_x\cdot m}{A_x},\frac{y_r-A_y\cdot n}{A_y}\right),$$
(EQ. 1.2)

where $$z_r = \frac{(f_1 z_s - z_h z_s + f_1 z_h)(f_2 z_s - z_h z_s + f_2 z_h)}{z_s^2(f_1 - f_2)} \xrightarrow{f_2 \to \infty}$$

$$-\frac{(z_s + z_h)(f_1 z_s - z_h z_s + f_1 z_h)}{z_s^2}$$

$$x_r = \frac{x_s z_h}{z_s}, \quad y_r = \frac{y_s z_h}{z_s}$$

$C_{4,5}$ are complex constants, a superscript asterisk represents a complex conjugate, and $z_r$ is the reconstruction distance of the point image from an equivalent optical hologram. It is noted that in the present example, the obtained hologram was digital and the reconstruction was done by the computer. In EQ. 1.2, the terms proportional to $C_4$ are referred to as bias components, the terms proportional to $C_5$ are referred to as real image components, and the terms proportional to $C_5^*$ are referred to as twin image components.

Note that $z_r$ is obtained specifically in the case that one of the phase masks on the SLM is constant ($f_2 \to \infty$). This choice was used in the present experiment because to practically the fill factor of the SLM was less than 100%, and therefore the constant phase modulation inherently existed in the SLM. Consequently, choosing $f_2 < \infty$ could cause unwanted three, instead of two, waves mixing on the hologram plane, one wave due to the constant phase and another two from the two different diffractive lenses.

EQ. 1.2 is the expression of the transparency function of a hologram created by an object point and recorded by a conventional lensless Fresnel incoherent correlation holography (FINCH) [see Rosen and Brooker supra] with a synthetic aperture which is $M\cdot A_x \times N\cdot A_y$ in size. This hologram has several unique properties. The transverse magnification $M_T$ is expressed as $M_T = \partial x_r/\partial x_s = z_h/z_s$. This is unlike a conventional Fresnel hologram, where $M_T = z_r/z_s$, and only in the latter expression $z_s$ represents the distance between the object and the recording medium (see, e.g., J. W. Goodman, Introduction to Fourier Optics, 2nd ed., McGraw-Hill, New York, 1996), pp. 314-317]. The axial magnification is $M_A = \partial z_r/\partial z_s = z_h(2f_1 z_s + 2f_1 z_h - z_h z_s)/z_s^3$. This is unlike a conventional hologram where $M_A = M_T^2$ (see. e.g., Goodman supra).

Based on these properties, and assuming the system is diffraction limited (namely that the limitation imposed by diffraction dominate all other limitations, such as noise and pixel size), the resolution limitations of the FINCH as an imaging system is that the minimum resolved object size is given by:

$$\Delta_{min} = \max\{\lambda/NA_{in},\lambda/(M_T NA_{out})\} = \max\{2\lambda z_s/D_{SLM},2\lambda z_r/(M_T D_{CCD})\}$$ (EQ. 1.3)

where $D_{SLM}, D_{CCD}$ are the diameters of the SLM, and the digital camera, respectively, and $NA_{in}$ and $NA_{out}$ are the numerical apertures at the input and output of the complete holographic system, respectively. The relation between the numerical aperture and the physical aperture is given by $NA/D=1/(2z)$. The resolution limit of a coherent Fresnel hologram in which the transverse magnification is $M_T = NA_{in}/NA_{out}$, and therefore the minimum resolved object size in case of the Fresnel coherent hologram is $\Delta_{min}=2\lambda z_s/D_H=2\lambda z_r/M_T D_H$, where $D_H$ is the diameter of a hologram. In other words, in FINCH the resolution limitation can be dictated by either the input or the output apertures.

The synthetic aperture system of the present embodiments is an extension of both apertures. Substituting the various parameters in EQ. 1.3 indicates that for $D_{SLM}=D_{CCD}=D$ and for $f_1<0$, the resolution is always determined by the output aperture as proved by the following inequality:

$$\left|\frac{2\lambda z_s}{D_{SLM}}\right| =$$

$$\left|\frac{2\lambda z_s}{D}\right| < \left|\frac{2\lambda z_r}{M_T D_{CCD}}\right| = \left|\frac{2\lambda z_r z_s}{z_h D}\right| = \left|\frac{2\lambda}{D} \cdot \frac{(z_s+z_h)(f_1 z_s - z_h z_s + f_1 z_h)}{z_h z_s}\right|$$

The use of negative diffractive lens with $f_1<0$ is preferred in a lensless FINCH setup because the diverging lens guarantees a high visibility of the holographic interference fringes on the camera plane for any $z_h$ distance.

Because the sum of the all of the rect functions in EQ. 1.2 is one rect function of the form rect$[x/(M \cdot A_x), y/(N \cdot A_y)]$, it is evident from EQ. 1.2 that the complete hologram tiled from M×N elements is a Fresnel hologram of a point with a synthetic aperture which is $M \cdot A_x \times N \cdot A_y$ in size, and it is M×N times larger than the physical aperture. Therefore, for N=M, $f_1<0$ and $f_2 \to \infty$ the transverse resolution power of the system of the present embodiments is higher than that of the real-aperture system by a number which is the inverse ratio between the minimal resolved sizes in these two cases:

$$\frac{\Delta_{min}^{RA}}{\Delta_{min}^{SA}} = \frac{2\lambda z_r^{RA}/M_T D_{CCD}^{RA}}{2\lambda z_r^{SA}/M_T D_{CCD}^{SA}} = \frac{N(|f_1|z_s + z_h z_s + |f_1|z_h)}{N|f_1|z_s + z_h z_s + N|f_1|z_h} \quad \text{(EQ. 1.4)}$$

where the superscript RA and SA stand for real (physical) and synthetic aperture, respectively. It is assumed in EQ. 1.4 that due to the finite size of the SLM pixels, increasing the SLM aperture (even synthetically) by N times is accompanied by increment of the focal length $|f_1|$ by the same rate.

EQ. 1.4 indicates that the synthetic aperture improves the resolution performance of lensless FINCH. The improvement is nevertheless less than the ratio between the synthetic and the physical apertures.

The present inventors found a technique which can ensure that the ratio between the minimal resolved sizes in the synthetic aperture system and in the physical aperture system equals the ratio between the synthetic and the real apertures.

Specifically present inventors found that when the wave from any object point is split by the SLM to a plane wave and a converging wave that converges to a point at a distance of $2z_h$ behind the SLM (or $z_h$ behind the CCD), the resulting ratio between $$\Delta_{min}^{SA} \text{ and } \Delta_{min}^{RA} \text{ is } \frac{\Delta_{min}^{SA}}{\Delta_{min}^{RA}} = \frac{D^{SA}}{D^{RA}} = N.$$

This can be achieved by placing a collimator such as a diffractive collimator before the SLM. The diffractive collimator represents a lens (or a synthetic aperture lens) with a positive focal length that equals the distance between the diffractive lens and the object, i.e. $Q[-1/(z_s)]$. At the same time, one of the phase masks on the SLM is constant ($f_2 \to \infty$), while the other focal length of the phase mask is between $$Q[-1/(2z_h)] \text{ and } Q\left[-1\Big/\left(\frac{2}{3}z_h\right)\right]$$

(focal length smaller then or equal to ($2z_h$) and bigger then or equal to $$\left(\frac{2}{3}z_h\right).$$

Since both the diffractive collimator and the SLM can be considered as thin optical elements, the same goal can be accomplished by placing a mask directly on the SLM in a lensless setup. For instance, this mask can be the multiplication result of the phase masks represented by the diffractive collimator and the SLM, namely, $$Q[-1/(z_s)] + Q[-1/(z_s)]Q[-1/(2z_h)],$$

$$\left(\text{it can also be } Q[-1/(z_s)] + Q[-1/(z_s)]Q\left[-1\Big/\left(\frac{2}{3}z_h\right)\right]\right),$$

or anywhere between) for object located at $z_s$ from the SLM.

EQ. 1.2 describes the Fresnel hologram obtained from a single object point, and therefore $I_h$ ($x_0, y_0$; $x_s, y_s, z_s$) is the point spread function (PSF) of the recording system in the synthetic aperture mode. The complete Fresnel hologram of a general incoherently-illuminated object $I_s(x_s, y_s, z_s)$ is an integral of the entire PSFs given by EQ. 1.2 over the object intensity distribution:

$$H(x_o, y_o) = \iiint I_s(x_s, y_s, z_s) I_h(x_o, y_o; x_s, y_s, z_s) dx_s dy_s dz_s \quad \text{(EQ. 1.5)}$$

The mosaic hologram given in EQ. 1.5 is a Fresnel incoherent hologram of the object but with the property that this hologram has been recorded with the effective aperture which is $M \cdot A_x \times N \cdot A_y$ in size.

The twin image and bias components were eliminated by recording three sub-holograms of the same object for each viewpoint, each characterized by a different phase constant of the SLM's phase mask. The final sub-hologram was a superposition of the three recorded sub-holograms, which superposition was performed so as to extract the real image component and eliminate the twin image and bias components. Further details regarding this superposition for a single pose is provided in Example 2 below (see EQ. 6 and the accompanying description). The digital reconstruction of the final complex-valued mosaic hologram was computed by Fresnel back propagation as known in the art.

Experimental Results

Two types of objects have been tested. The first object was a binary grating with cycle length of 4 lines per millimeter, and the second object was a combination of two binary gratings with different cycle lengths, one with 2 lines per millimeter and the other with 4 lines per millimeter. The distance from the object to the SLM was 52 cm, and the distance between the phase-only SLM and the digital camera was 38.5 cm. A 100 W Halogen ARC lamp was used for objects illumination, and the BPF was placed in front of and in close proximity to the SLM. The experimental results are shown in FIGS. 9A-J for the first object, and in FIGS. 10A-L for the second object.

Figure 9:
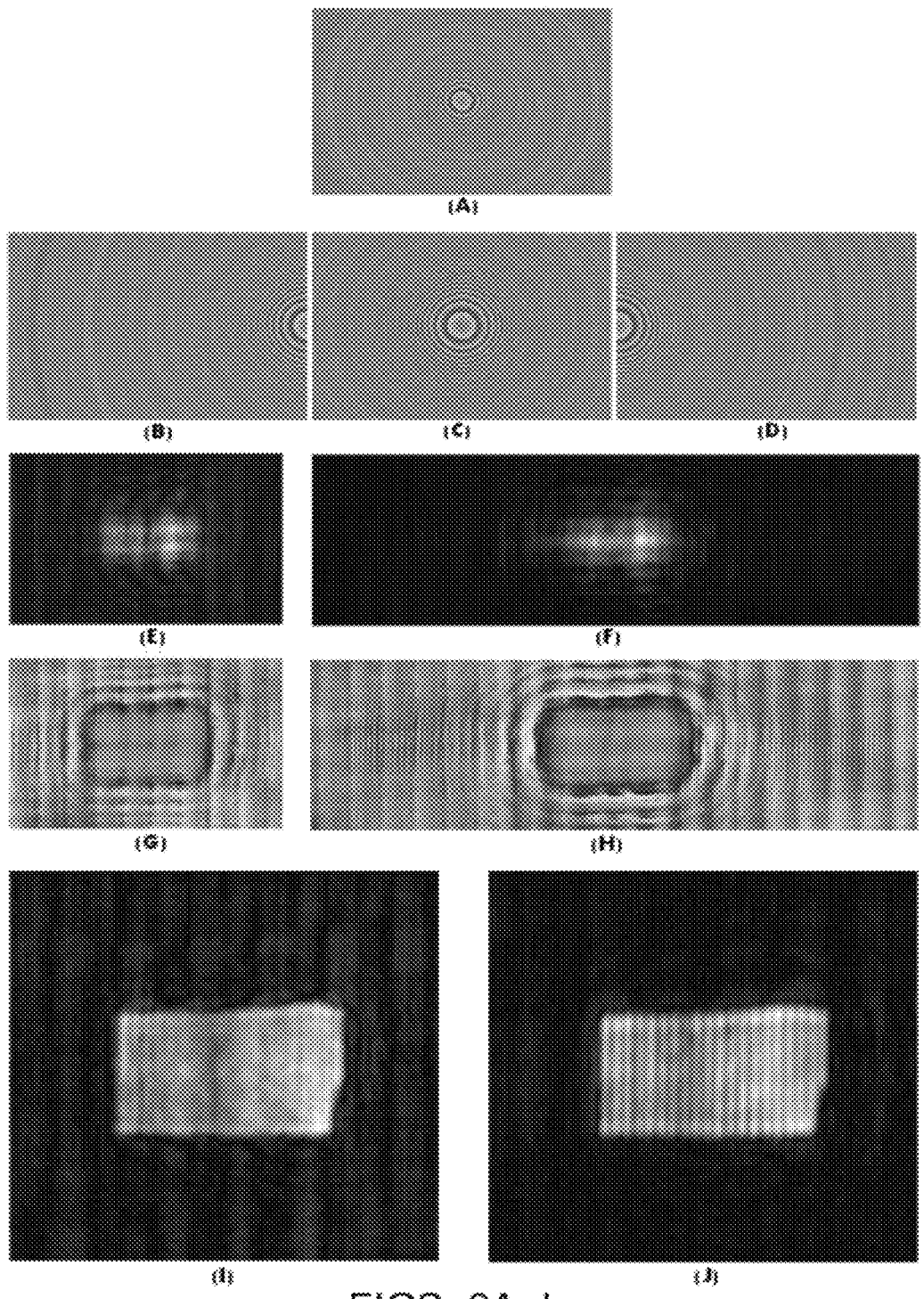
FIGS. 9A-J show results of the experiments performed according to some exemplary embodiments of the present invention for a grating object using physical aperture (FIGS. 9A, 9E, 9G, 9I) and synthetic aperture (FIGS. 9B, 9C, 9D, 9F, 9H, 9J)

In the first experiment a hologram was generated using the physical aperture namely without reposing the system to a different view at the time $t_2$ (see FIG. 8). The hologram was generated as a superposition of three holograms having three different phase factors: $\phi_1=0°$, $\phi_2=120°$ and $\phi_3=240°$. FIG. 9A shows a modulation pattern of the reflection masks displayed on the SLM for $\phi_2=120°$.

The SLM's fill factor was 87% meaning that part of the light is reflected from the SLM without any modulation. In order to avoid the interference of three waves projected on the camera, one of the phase elements was selected to be a constant. The other phase element were selected to be a negative diffractive lens with the shortest focal length that can be achieved with the SLM having the pixel size of 8 μm.

The shortest focal length guaranteed maximum resolution power for a given aperture size. In the case of the physical aperture and the synthetic aperture, the focal lengths were −34 cm and −68 cm, respectively. The value of $NA_{in}$ was 0.0115 and 0.0231 for the physical and synthetic apertures, respectively. The value of $NA_{out}$ was 0.0035 and 0.0044 for the physical and synthetic apertures, respectively. Note that the sum of two pure phase functions, i.e., the quadratic phase function $Q[-1/f_1]$ and the constant phase function, is no longer a pure phase function, but a complex function with non-constant magnitude. The general complex function was recorded according to the teachings of see Rosen and Brooker supra. Each phase function was distributed randomly among half of the SLM pixels. The three recorded holograms were superposed according to the superposition equation given in Rosen and Brooker, Opt. Lett. 32, 912-914 (2007).

Figure 10:
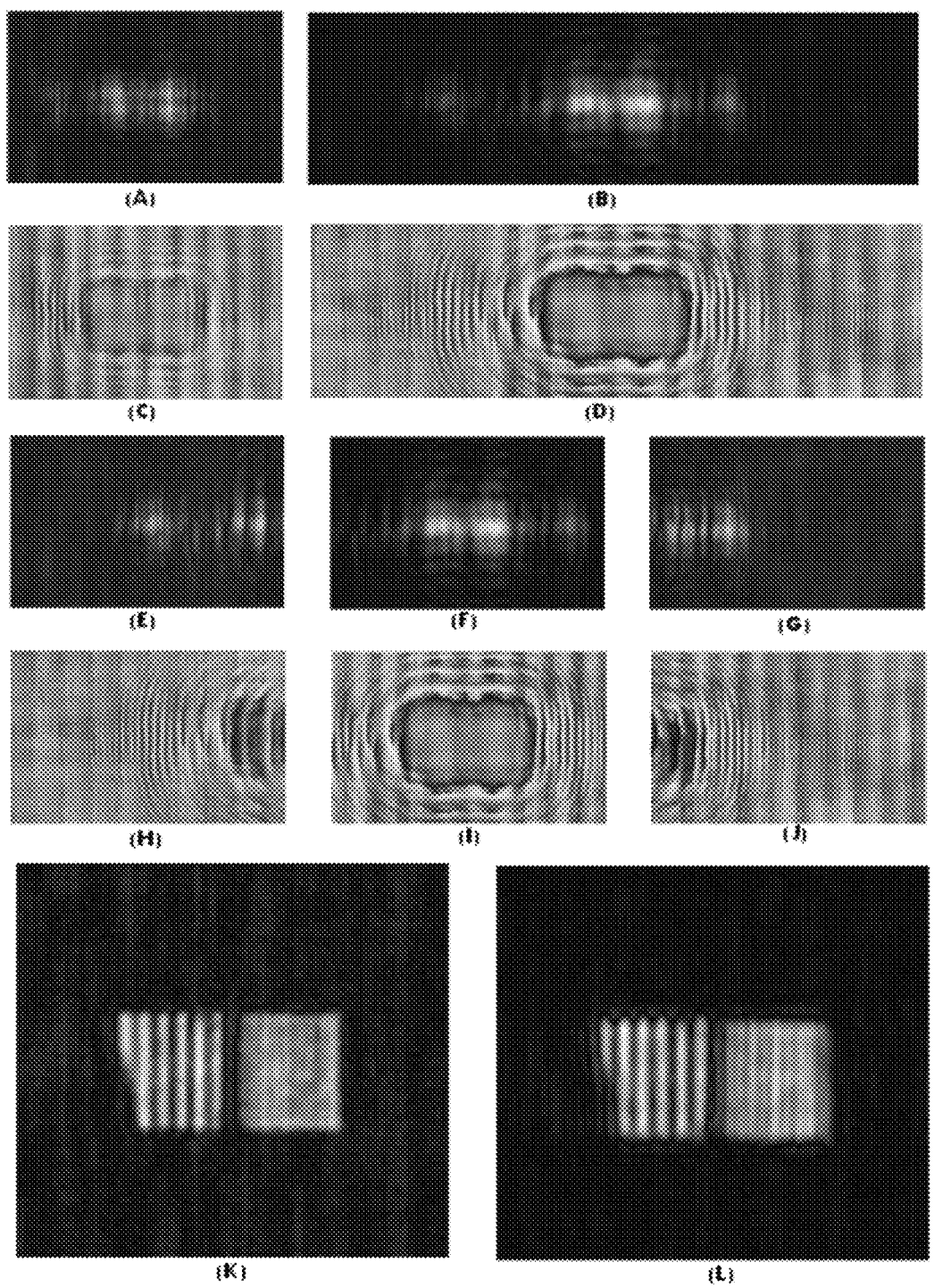
FIGS. 10A-L show results of the experiments performed according to some exemplary embodiments of the present invention for an object which includes two binary gratings, using physical aperture (FIGS. 10A, 10C, 10K) and synthetic aperture (FIGS. 10B, 10D, 10E, 10G, 10H, 10I, 10J, 10L)

FIGS. 9E, 9G, 10A AND 10C show are the magnitude (FIGS. 9E and 10A) and the phase (FIGS. 9G and 10C) of the superposed holograms for the first object (FIGS. 9E and 9G) and the second object (FIGS. 10A and 10C). As shown, the resolution along the horizontal direction of the reconstructed image, computed by Fresnel back propagation, is low in the sense that the image is lacking the original high-frequency gratings along the horizontal direction. This is because the aperture is too narrow to capture the entire gratings spectral content. This low resolution reconstructed image is shown in FIG. 9I for the first object and FIG. 10K for the second object.

In the second experiment a synthetic aperture mode was employed. To this end nine different phase masks were displayed on the SLM, three phase masks for each pose of the SLM-camera set: left pose, central pose and right pose. Each of the masks had an actual aperture of 1500×1000 pixels. For each pose three sub-holograms were generated using the same three different phase factors as in the first experiment (0°, 120° and 240°). In order to avoid edge effects on the recorded holograms there was an overlap of 750 pixels among the three actual apertures combining the synthetic aperture. For each pose of the system, the three recorded sub-holograms were superposed as in the first experiment.

FIGS. 9B-D show three masks out of the nine employed. Each of these masks was displayed at a different time and a different pose of the setup along the horizontal axis. The superposed complex-valued sub-hologram from each pose of the system was stored in the computer. Upon completing the system movement along the entire synthetic aperture, all three holographic elements were tiled to a single mosaic hologram.

FIGS. 9F, 9H, 10B and 10D show the magnitude (FIGS. 9F and 10B) and phase (FIGS. 9H and 10D) of the mosaic hologram for the first object (FIGS. 9F and 9H) and the second object (FIGS. 10B and 10D).

FIGS. 10E-G and 10H-J are, respectively, the magnitude and the phase of the sub-holograms from which the synthetic aperture mosaic hologram of the second object was assembled.

The reconstruction result of the mosaic hologram, computed by Fresnel back propagation, is depicted in FIG. 9J for the first object and FIG. 10L for the second object. The binary grating on the observed objects is seen well in the reconstructed images, indicating that the synthetic aperture is wide enough to acquire most of the horizontal spectral information of the objects.

Example 2

Noise Reduction

Figure 11:
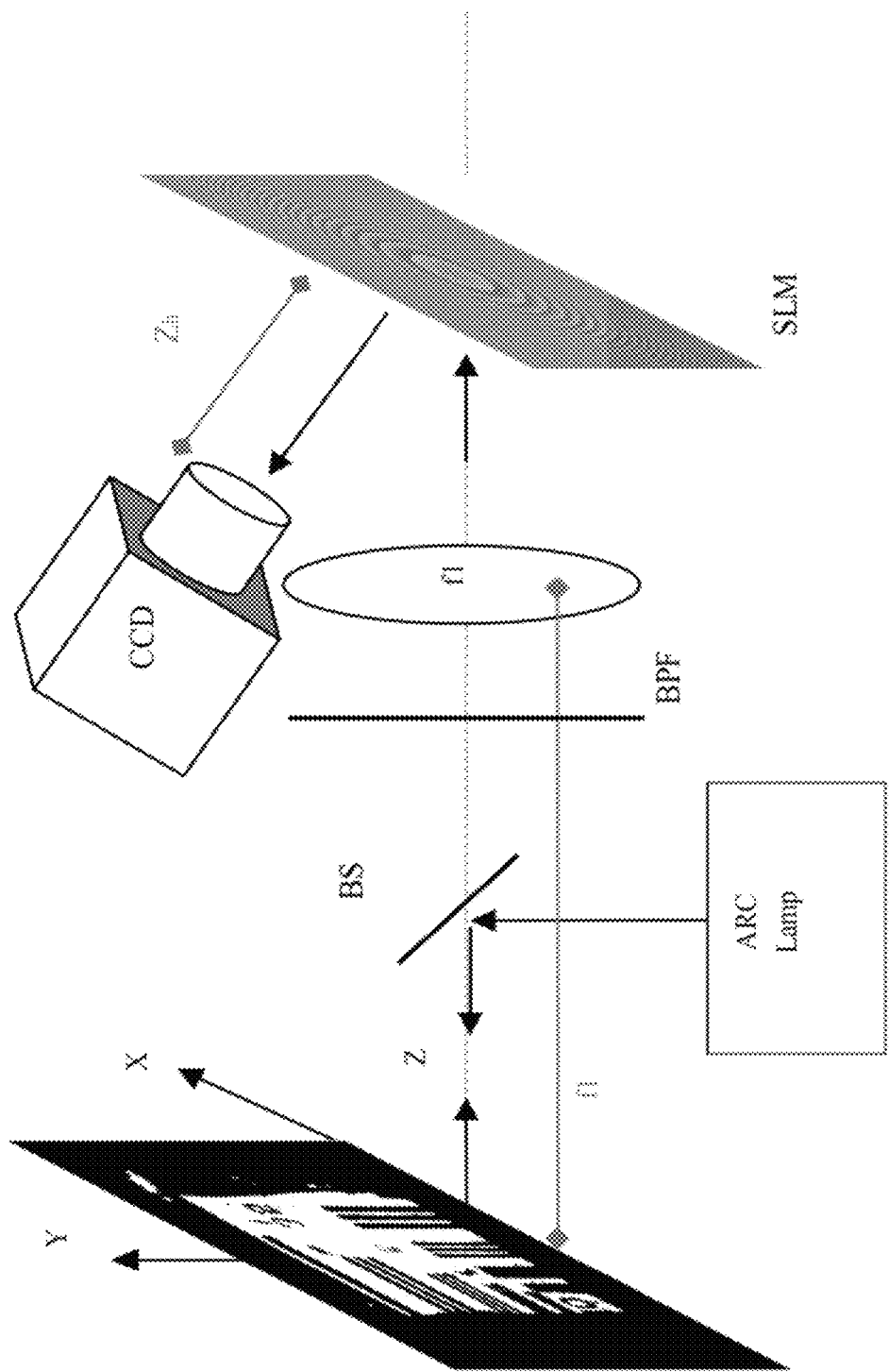
FIG. 11 is a schematic illustration of am experimental setup used in experiments performed to investigate a noise reduction procedure and the effect of focal length variations according to some exemplary embodiments of the present invention.

Experiments were made to produce holograms from passively collected incoherent light using a synthetic aperture with Fresnel elements (SAFE). The Experiments included a noise reduction procedure in accordance with some exemplary embodiments of the present invention.
Description of the Experimental System
The experimental setup is illustrated in FIG. 11. The setup included a target object a light source (100 W Halogen ARC lamp), a beam splitter and a holographic apparatus. The beam splitter was positioned between the holographic apparatus and the object such that to allow light from the light source to illuminate the object and light reflected from the object to pass through the beam splitter and arrive at the holographic apparatus. The target objects, each 5 mm×6 mm in size, contained vertical and horizontal binary gratings with line density ranging from 3 lines per millimeter to 10 lines per millimeter were used as objects.

The holographic apparatus included a band pass filter (bandwidth 40 nm, central wavelength 550 nm), a positive refractive lens (focal length $f_1$=50 cm), a diffractive phase-only SLM (Holoeye, PLUTO) and a CCD (PixelFly).

The target was located at the back focal plane of the refractive lens. Thus, the object wave front arriving the SLM was in the form of a plane wave. The CCD was placed in the optical path of light reflected from the SLM at a distance of 34 cm from the SLM. Each diffractive phase element was distributed randomly among half of the SLM pixels.

For clarity of presentation, the experiments described in this examples were conducted without reposing the holographic apparatus, namely using only the physical aperture of the apparatus.
Theoretical Considerations
As in Example 1 above, the quadratic Q and a linear L phase functions were employed. It is assumed that the focal length $f_1$ of the refractive lens equals $Q[-1/z_s]$ and that the SLM is detached to the refractive lens. The wave reached the SLM is in the form of $C_1(x_s,y_s)L[-x_s/z_s,-y_s/z_s]$, and each tilted diverging spherical wave is split into two waves by the SLM mask which is a sum of two aperture-limited quadratic phase functions of the form $(C_2Q[-1/f_2]+C_3Q[-1/f_3])$ where $f_2, f_3$ are real constants indicating the two effective focal lengths of the diffractive pattern on the SLM and $C_{2,3}$ are complex constants. Similarly to Example 1, one of the phase masks on the SLM was set to be constant ($f_3 \to \infty$). Thus, the mask representation on the SLM was $(C_2Q[-1/f_2]+C_3)$. The complex amplitude on the camera plane $(x_o,y_o)$ was computed as a convolution between the complex amplitude on the SLM and the function $Q[1/z_h]$. A complete Fresnel hologram of the object point located at $(x_s,y_s,z_s)$ is:

$$I_h(x_o, y_o; x_s, y_s, z_s) = \left| \left\{ C_1(x_s, y_s)L\left[\frac{-x_s}{z_s}, \frac{-y_s}{z_s}\right] \times \left( C_2 Q\left[\frac{-1}{f_2}\right] + C_3 \right) \right\} * Q\left[\frac{1}{z_h}\right] \right|^2. \quad \text{(EQ. 2.1)}$$

The intensity distribution recorded by the CCD is:

$$I_h(x_o, y_o; x_s, y_s, z_s) = \begin{pmatrix} C_4 + C_5(x_s, y_s)Q\left[\frac{-1}{z_r}\right]L\left[\frac{-x_r}{z_r}, \frac{-y_r}{z_r}\right] + \\ C_5^*(x_s, y_s)Q\left[\frac{1}{z_r}\right] \times L\left[\frac{x_r}{z_r}, \frac{y_r}{z_r}\right] \end{pmatrix}, \quad \text{(EQ. 2.2)}$$

where $z_r = f_2 + z_h$, $x_r = x_s z_h/f_1$, $y_r = y_s z_h/f$, and $C_{4,5}$ are complex constants. $z_r$ is the reconstruction distance of the point image from an equivalent optical hologram. As in Example 1 above, the hologram was digital, and the reconstruction was done by the computer. The mathematical operations leading from EQ. 2.1 to EQ. 2.2 are similar to those leading from EQ. 1.1 and 1.2, and can therefore be inferred by one of ordinary skills in the art from the detailed description provided in Appendix 1, below.

The minimum resolved object size is:

$$\Delta_{min} = \max\{2\lambda f_1/D_{SLM}, 2\lambda z_r/(M_T D_{CCD})\} \quad \text{(EQ. 2.3)}$$

The complete Fresnel hologram of a general incoherently-illuminated object $I_s(x_s, y_s, z_s)$ is an integral of the entire PSFs given by EQ. (2.2) over the object intensity distribution:

$$H(x_o, y_o) = \iiint I_s(x_s, y_s, z_s) I_h(x_o, y_o; x_s, y_s, z_s) dx_s dy_s dz_s. \quad \text{(EQ. 2.4)}$$

Optimal resolution can be obtained once the following relation between the input numerical aperture $NA_{in}$ and the output numerical aperture $NA_{out}$ is satisfied:

$$NA_{in} = |D_{SLM}/(2f_1)| = |(M_T D_{CCD})/(2z_r)| = M_T NA_{out}. \quad \text{(EQ. 2.5)}$$

In the current setup, $M_T = \partial x_r/\partial x_s = z_h/z_s = z_h/f_1$ and $z_r = f_2 z_h$. When $D_{SLM} = D_{CCD}$, EQ. 2.5 may also be satisfied by setting $f_2 = -2z_h$. Thus, in various exemplary embodiments of the invention the focal distance of the positive diffractive lens on the SLM is twice the distance between the SLM and CCD.

The twin image and bias components were eliminated in accordance with preferred embodiments of the present invention by recording three holograms, each of which is recorded with a different phase constant $\phi_j$ (j=1, 2, 3). The complex-valued hologram without the twin image and bias components was obtained by a digital superposition of these three holograms, as follows:

$$H_f(x, y; t) = H_1(x, y; t_1)[\exp(-i\phi_3) - \exp(-i\phi_2)] + \quad \text{(EQ. 2.6)}$$
$$H_2(x, y; t_2)[\exp(-i\phi_1) - \exp(-i\phi_3)] +$$
$$H_3(x, y; t_3)[\exp(-i\phi_2) - \exp(-i\phi_1)],$$

where $H_1(x,y; t_1)$, $H_2(x,y; t_2)$ and $H_3(x,y; t_3)$ are the holograms set recorded by the digital camera at time $t_1$, $t_2$ and $t_3$, respectively. Stepwise phase shifts differences of $2\pi/3$ were used so that a complete phase cycle of $2\pi$ was accomplished.

In the process of reconstructing a complex-valued hologram (CVH), speckle-like noise typically accompanies the reconstruction. The noise may come from the shot noise of the digital camera and/or the temporal fluctuations of the SLM. Speckle noise can be modeled as the random walk problem in the complex domain with uniform likelihood for the phase of the noise signals to lie anywhere in the primary interval $(-\pi, \pi)$. In this case, the CVH is given by $\hat{H}_f(x,y; t) = H_f(x,y; t) + n(x,y; t)$, where $H_f$ is a noise-free CVH and n represents the noise. Increasing the number of recorded sets of holograms to N', results in M'=N'/3 independent CVHs. Each $\hat{H}_f(x,y; t)$, generated by a different subset of three recorded holograms (each with a different three phase factor), contains the same noise-free hologram but statistically different noise component. Suppression of the speckle noise can be achieved in accordance with preferred embodiments of the present invention by averaging over the CVHs:

$$\hat{H}_{M'}(x, y) = \frac{1}{M'} \sum_{i=1}^{M'} \hat{H}_f(x, y; t_i). \quad \text{(EQ. 2.7)}$$

Experimental Results

Two different experiments were conducted. In the first experiment the noise suppression method was validated, and in the second experiment the system performance was validated.

Each set of three recorded holograms were superposed according to EQ. 2.6. The results of the first experiment are shown in FIGS. 12A-L and 13, and the results of the second experiment are shown in FIGS. 14A-L.

In the first experiment, the experimental setup of FIG. 11 was used, with $f_1 = 50$ cm, $f_2 = 2z_h$ and $f_3 \to \infty$. The experiment included generation of M different average CVHs based on N=3M recorded holograms, for M=1, 2, . . . , 6. Each triplet of images included images obtained using three different phase factors ($\phi_{1,2,3} = 0°$, 120° and 240°, respectively).

Figure 12:
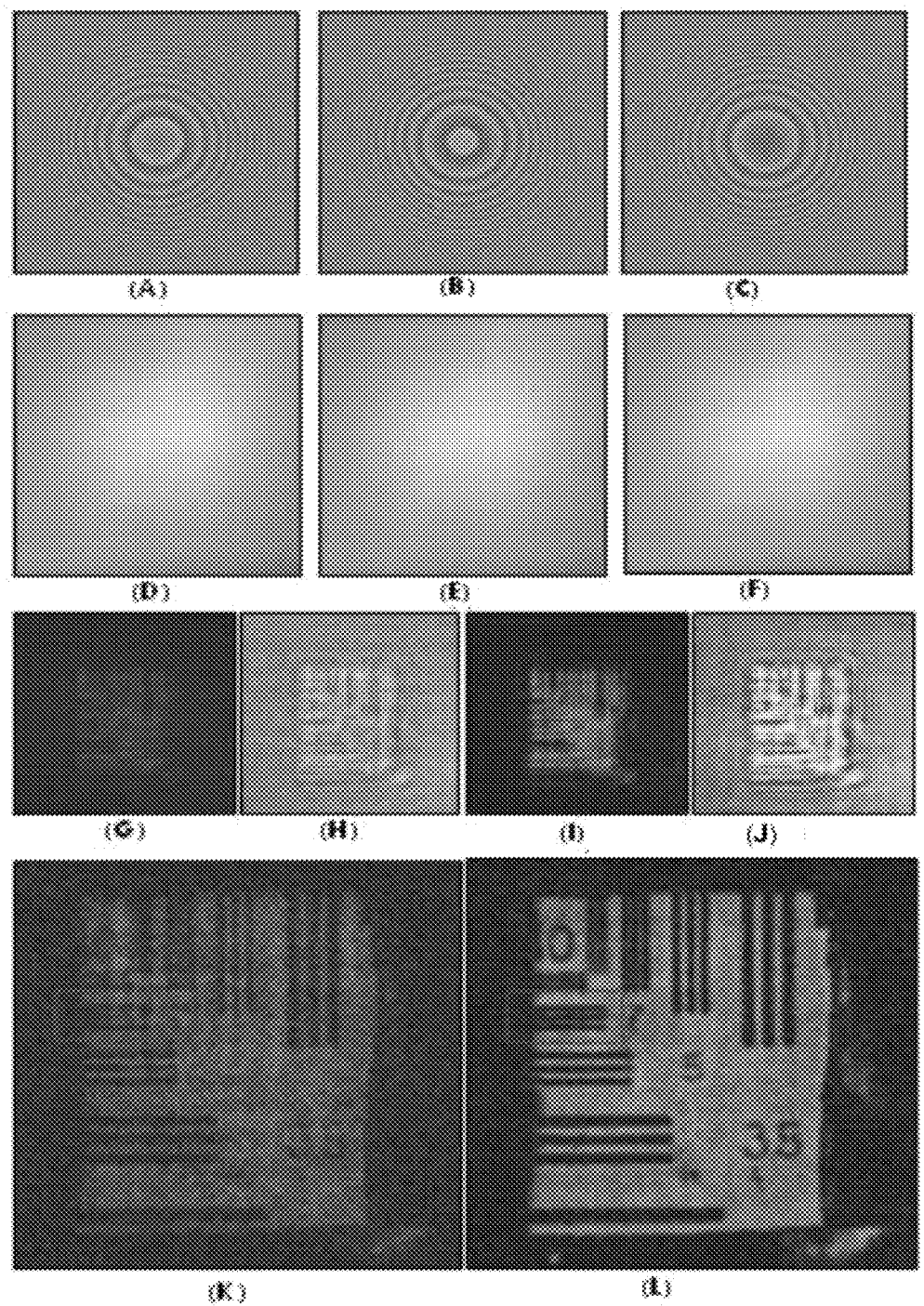
FIGS. 12A-L show experimental results obtained in an experiment performed to investigate a noise reduction procedure according to some exemplary embodiments of the present invention.

FIGS. 12A-C show the three masks displayed on the SLM during the holograms recording process, and FIGS. 12D-F show the three holograms used to create the averaged CVH based on a single CVH.

FIGS. 12G-J show the magnitude (FIGS. 12G and 12I) and phase (FIGS. 12H and 12J) of the averaged CVH generated based on a single CVH (FIGS. 12G-H) and the based on M=6 averaged CVHs (FIGS. 12I-J). The best in-focus reconstructed plane, computed by Fresnel back propagation, corresponding to the two averaged CVH of FIGS. 12G-J, are shown in FIGS. 12K-L. As shown, the resolution along the horizontal and vertical directions of the reconstructed image is improved in FIG. 12L in the sense that this image reveals some of the original high-frequency gratings. Note that since in this case the system was also noise limited, reduction of noise also improved the resolution.

A quantitative comparison of the various holograms is carried out by measuring the signal-to-noise ratio (SNR) in different typical, relatively uniform, areas from the best in-focus reconstructed plane as a function of M. In the present experiment, M was varied from 1 to 6.

The SNR was defined as:

$$SNR = \frac{|\mu|}{\sigma} \quad \text{(EQ. 2.8)}$$
$$= \frac{\left|\frac{1}{KL}\sum_{k=1}^{K}\sum_{l=1}^{L} P(k, l)\right|}{\sqrt{\frac{1}{KL}\sum_{k=1}^{K}\sum_{l=1}^{L}\left|P(k, l) - \frac{1}{KL}\sum_{k=1}^{K}\sum_{l=1}^{L} P(k, l)\right|^2}},$$

where $\mu$, $\sigma$ are the mean and standard deviation of a speckle-like noise at uniform area P(k,l) on the best in-focus reconstructed plane; k, l are the coordinates of each pixel; and K, L are the dimensions of the considered area.

An improved quality of the reconstructed images can be achieved by increasing the number of holograms in the recorded hologram set. The standard deviation $\sigma_{M'}$ of the average over M' independent random variables satisfies the relation $\sigma_{M'}=\sigma_1/\sqrt{M'}$, where $\sigma_1$ is the standard deviation of a single random variable.

Figure 13:
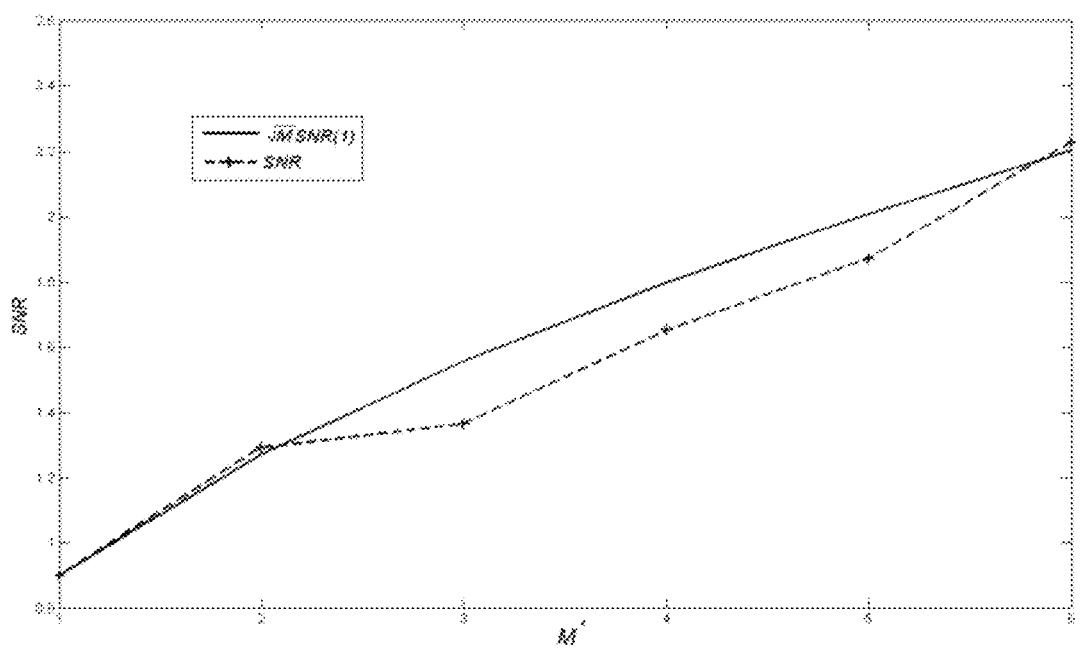
FIG. 13 is a graph showing the signal-to-noise ratio as a function of the number of image triplets, as obtained theoretically (solid line) and experimentally (dotted line) according to some embodiments of the present invention.

FIG. 13 shows a comparison between the theoretical curve of SNR (SNR(1)·$\sqrt{M'}$) and the experimentally measured SNR for different averages of CVHs. As shown, the improvement in the experimentally measured SNR increases monotonically with M', in agreement with the theoretical curve. It is expected that for larger values of M' the theoretical and experimental curves will be more close to each other.

In the second experiment, the averaged CVH presented in FIGS. 14A and 14B and generated with an initial set of 18 holograms, has been compared with three other averaged CVHs recorded with some modifications of the setup.

Each modification included a different combination of the focal lengths $f_1$, $f_2$ and $f_3$. Specifically, in the first modification, $f_2$ was set to $3z_h$; in the second modification $f_2$ was set to $3z_h$; and in the third modification the refractive lens $f_1$ was removed (hence effectively setting $f_1=\infty$).

In the first and second modifications, all parameters, other than $f_2$ were the same as in the first experiment. In the third modification, the object was placed closer to the SLM to maintain the same numerical aperture, and the phase element on the SLM has been chosen to be a diffractive lens with the shortest focal distance that can be achieved with the SLM having a pixel size of 8 μm. The shortest focal distance guarantees to maximum resolution power for a given aperture size. In the case of the PLUTO SLM aperture (1080× 1080 pixels), where each diffractive phase element is distributed randomly among half of the SLM pixels, the minimal focal length was $f_2=23$ cm.

All three averaged CVHs were obtained using an initial set of 18 holograms and an input numerical aperture of 0.0086. FIGS. 14A-L show the magnitude (FIGS. 14A, 14D, 14G and 14J), phase (FIGS. 14B, 14E, 14H and 14K) and best in-focus reconstructed plane (FIGS. 14C, 14F, 14I and 14L), of the average CVH recorded with the set-up of the first experiment (FIGS. 14A-C), first modification (FIGS. 14D-E), second modification (FIGS. 14G-I) and third modification (FIGS. 14J-L). As shown, the reconstructed in-focus plane is better with the setup of experiment 1 (FIGS. 14A-C) than with any of the three modifications (FIGS. 14D-E, 14G-I and 14J-L).

APPENDIX 1

In this appendix, EQ. 1.2 is derived from EQ. 1.1.
EQ. 1.1 is:

$$I_h(x_o, y_o; x_s, y_s, z_s) = \sum_{n=\frac{1-N}{2}}^{\frac{N-1}{2}} \sum_{m=\frac{1-M}{2}}^{\frac{M-1}{2}} \left| \begin{array}{c} C_1(x_s, y_s)Q\left[\frac{1}{z_s}\right]L\left[\frac{-x_s}{z_s}, \frac{-y_s}{z_s}\right] \times \\ \left(C_2Q\left[\frac{-1}{f_1}\right]+C_3Q\left[\frac{-1}{f_2}\right]\right)rect\left(\frac{x-A_x\cdot m}{A_x}, \frac{y-A_y\cdot n}{A_y}\right)*Q\left[\frac{1}{z_h}\right] \end{array} \right|^2 . \quad \text{(EQ. A1)}$$

The products of the Q functions is calculated and EQ. A1 becomes:

$$I_h(x_o, y_o; x_s, y_s, z_s) = \quad \text{(EQ. A2)}$$

$$\sum_{n=\frac{1-N}{2}}^{\frac{N-1}{2}} \sum_{m=\frac{1-M}{2}}^{\frac{M-1}{2}} \left| \begin{array}{c} C_1(x_s, y_s)L\left[\frac{-x_s}{z_s}, \frac{-y_s}{z_s}\right]\left(\begin{array}{c} C_2Q\left[\frac{f_1-z_s}{f_1 z_s}\right]+ \\ C_3Q\left[\frac{f_2-z_s}{f_2 z_s}\right] \end{array}\right)\cdot \\ rect\left(\frac{x-A_x\cdot m}{A_x}, \frac{y-A_y\cdot n}{A_y}\right)*Q\left[\frac{1}{z_h}\right] \end{array} \right|^2 .$$

If $A_x$ and $A_y$ are sufficiently wide and $z_h$ is sufficiently short then one can assume that the width of each diffraction pattern on the camera plane from each (m,n)-th aperture is approximately $A_x \times A_y$. Following calculation of free space propagation from each (m,n)-th aperture along $z_h$, calculation of the intensity on the camera plane and multiplication of this intensity pattern by the rectangle window function, EQ. A2 becomes:

$$I_h(x_o, y_o; x_s, y_s, z_s) = \quad \text{(EQ. A3)}$$

$$\left| \begin{array}{c} C_1(x_s, y_s)L\left[\frac{-x_s}{z_s}, \frac{-y_s}{z_s}\right] \\ \left(C_2Q\left[\frac{f_1-z_s}{f_1 z_s}\right]+C_3Q\left[\frac{f_2-z_s}{f_2 z_s}\right]\right)*Q\left[\frac{1}{z_h}\right] \end{array} \right|^2 \cdot$$

$$\sum_{n=\frac{1-N}{2}}^{\frac{N-1}{2}} \sum_{m=\frac{1-M}{2}}^{\frac{M-1}{2}} rect\left(\frac{x-A_x\cdot m}{A_x}, \frac{y-A_y\cdot n}{A_y}\right).$$

Next, the free-space propagation along $z_h$ of the two inclined spherical waves emerging from the SLM is calculated. A point source at $(x_s, y_s)$ induces an inclined spherical wave (on some plane a distance $z_s$ from the source) in the form of $C(x_s,y_s)Q[1/z_s]L[-x_s/z_s,-y_s/z_s]$. Therefore, any further propagation, say along $z_h$, results in a complex amplitude of $C'(x_s, y_s)Q[1/(z_s+z_h)]L[-x_s/(z_s+z_h),-y_s/(z_s+z_h)]$. It is concluded that if the wave distribution at some $z_s$ plane is $C(x_s,y_s)Q[1/z]L[A,B]$, then at some further plane, at distance $z_h$ far from the plane $z_s$, the complex amplitude can be expressed as:

$$u(x, y; z_h) = \left(C(x_s, y_s)Q\left[\frac{1}{z}\right]L[A, B]\right)*Q\left[\frac{1}{z_h}\right] = \quad \text{(EQ. A4)}$$

$$C'(x_s, y_s)Q\left[\frac{1}{z+z_h}\right]L\left[\frac{Az}{z+z_h}, \frac{Bz}{z+z_h}\right].$$

Applying the rule of spherical wave propagations formulated in EQ. A4 on EQ. A3 yields the following intensity:

$$I_h(x_o, y_o; x_s, y_s, z_s) = \quad \text{(EQ. A5)}$$

$$\left| \begin{array}{c} C'(x_s, y_s)L\left[\frac{-f_1 x_s}{z_h+\frac{f_1 z_s}{f_1-z_s}}, \frac{-f_1 y_s}{z_h+\frac{f_1 z_s}{f_1-z_s}}\right]Q\left[\frac{1}{z_h+\frac{f_1 z_s}{f_1-z_s}}\right]+ \\ C''(x_s, y_s)L\left[\frac{-f_2 x_s}{z_h+\frac{f_2 z_s}{f_2-z_s}}, \frac{-f_2 y_s}{z_h+\frac{f_2 z_s}{f_2-z_s}}\right]Q\left[\frac{1}{z_h+\frac{f_2 z_s}{f_2-z_s}}\right] \end{array} \right|^2$$

-continued $$\times \sum_{n=\frac{1-N}{2}}^{\frac{N-1}{2}} \sum_{m=\frac{1-M}{2}}^{\frac{M-1}{2}} rect\left(\frac{x - A_x \cdot m}{A_x}, \frac{y - A_y \cdot n}{A_y}\right) \cdot =$$

$$\left| C'(x_s, y_s) L \begin{bmatrix} \frac{-f_1 x_s}{z_h f_1 - z_s z_h + f_1 z_s}, \\ \frac{-f_1 y_s}{z_h f_1 - z_s z_h + f_1 z_s} \end{bmatrix} Q\left[\frac{f_1 - z_s}{z_h f_1 - z_s z_h + f_1 z_s}\right] + C''(x_s, y_s) L \begin{bmatrix} \frac{-f_2 x_s}{z_h f_2 - z_s z_h + f_2 z_s}, \\ \frac{-f_2 y_s}{z_h f_2 - z_s z_h + f_2 z_s} \end{bmatrix} Q\left[\frac{f_2 - z_s}{z_h f_2 - z_s z_h + f_2 z_s}\right] \right|^2$$

$$\times \sum_{n=\frac{1-N}{2}}^{\frac{N-1}{2}} \sum_{m=\frac{1-M}{2}}^{\frac{M-1}{2}} rect\left(\frac{x - A_x \cdot m}{A_x}, \frac{y - A_y \cdot n}{A_y}\right)$$

Calculating the Magnitude Squared Expression of the First Part of EQ. A5 Leads directly to the final expression given in EQ. 1.2.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of generating a hologram of an object using a holographic apparatus having a physical aperture, the method comprising:
receiving data including a plurality of holographic data respectively corresponding to a plurality of sub-holograms acquired from non-coherent electromagnetic radiation by the holographic apparatus, each holographic data encoding both magnitude and phase of said non-coherent electromagnetic radiation, the holographic apparatus having a wave modulator receiving said non-coherent electromagnetic radiation from the object, wherein each sub-hologram is acquired at a different position and/or orientation of said physical aperture, such that the combination of holographic data from said different positions and/or orientations defines a synthetic aperture which is larger than said physical aperture;
tiling said sub-holograms to generate a mosaic hologram of the object, wherein a resolution power of said mosaic hologram is higher than a resolution power of each individual sub-hologram; and
transmitting said mosaic hologram to a computer readable medium.

2. The method according to claim 1, further comprising displaying said mosaic hologram.

3. The method according to claim 1, further comprising generating said data.

4. The method according to claim 3, wherein said generating said data comprises:
receiving a wave modulation pattern and defining a plurality of sub-patterns, respectively corresponding to a plurality of views, such that alignment of said sub-patterns according to said views form a mosaic pattern corresponding to said modulation pattern; and
for each view, passively collecting said non-coherent electromagnetic radiation arriving from the object, modulating said non-coherent electromagnetic radiation according to a respective sub-pattern to record image data associated with said view, and processing said recorded image data to provide data corresponding to a sub-hologram associated with said view.

5. The method according to claim 4, further comprising filtering said electromagnetic radiation prior to said modulation using a band pass filter.

6. The method according to claim 4, further comprising polarizing said electromagnetic radiation prior to said modulation.

7. The method according to claim 4, further comprising collimating said electromagnetic radiation prior to or during said modulation.

8. The method according to claim 7, wherein said collimating is by a collimator characterized by a focal length F, wherein said recording is by a recorder and said modulation is by a modulator between said collimator and said recorder, and wherein said recorder at a distance of from about 0.5 F to about 1.5 F from said modulator.

9. The method according to claim 4, wherein said recording of said image data comprises sequentially recording at least one set of images each image of said at least one set being characterized a different phase constant, and wherein the method further comprises extracting real image data from each set.

10. The method according to claim 9, wherein said at least one set comprises a plurality of sets and the method comprises averaging said real image data over said sets, thereby providing averaged real image data characterized by a signal-to-noise ratio which is higher than a signal-to-noise ratio of real image data of a single set.

11. The method according to claim 4, wherein said mosaic pattern defines an area which is at least 10 times larger than an area of the largest sub-pattern.

12. The method according to claim 4, wherein said mosaic pattern defines an area of at least 1 square kilometer.

13. The method according to claim 4, wherein said electromagnetic radiation is in the microwave to X-ray domain.

14. The method according to claim 4, wherein said image data represent Fresnel holograms.

15. The method according to claim 4, wherein said image data represent Fourier holograms.

16. The method according to claim 4, wherein said image data represent image hologram.

17. The method according to claim 4, wherein said image data represent digital hologram.

18. The method according to claim 4, wherein said image data represent non-digital hologram.

19. The method according to claim 4, wherein said image data represent on-axis hologram.

20. The method according to claim 4, wherein said image data represent off-axis hologram.

21. The method according to claim 4, wherein said image data represent general hologram.

22. The method of claim 1, wherein said holographic apparatus does not irradiate the object.

23. A system for generating a hologram of an object, comprising:
   (a) a processor having a circuit supplemented by software configured for receiving a wave modulation pattern and defining a plurality of sub-patterns, respectively corresponding to a plurality of different views, such that tiling of said sub-patterns according to said views form a mosaic pattern corresponding to said modulation pattern; and
   (b) a holographic apparatus, for receiving view and sub-pattern data from said processor, said holographic apparatus having a wave modulator and a recorder assembly, wherein for each view, said holographic apparatus assumes a position and/or an orientation to establish a viewing axis specific to said view, passively collects by said wave modulator non-coherent electromagnetic radiation arriving from the object, and modulates said radiation according to a respective sub-pattern to record by said recorder assembly image data associated with said view, said image data comprising both magnitude and phase of said non-coherent electromagnetic radiation;
   wherein said processor is configured for generating a mosaic hologram of the object by tiling image data associated with said plurality of views, wherein a resolution power of said mosaic hologram is higher than a resolution power characterizing image data associated with each view.

24. The system according to claim 23, wherein said holographic apparatus features a band pass filter for filtering said electromagnetic radiation prior to said modulation.

25. The system according to claim 23, wherein said holographic apparatus comprises a collimator for collimating said electromagnetic radiation prior to or during said modulation.

26. The system according to claim 25, wherein said modulator is between said collimator and said recorder at a distance of about from about 0.5 F to about 1.5 F from said recorder, F being a focal length of said collimator.

27. The system according to claim 23, wherein said holographic apparatus is configured for sequentially recording at least one set of images, each image of said at least one set being characterized a different phase constant, and wherein said processor is configured for extracting real image data from each set.

28. The system according to claim 27, wherein said at least one set comprises a plurality of sets and said processor is configured for averaging said real image data over said sets, thereby providing averaged real image data characterized by a signal-to-noise ratio which is higher than a signal-to-noise ratio of real image data of a single set.

29. A system for generating a hologram of an object, comprising:
   a holographic apparatus having a wave modulator and a recorder assembly, said holographic apparatus being characterized by a physical aperture and being configured for acquiring non-coherent electromagnetic radiation corresponding to a plurality of sub-holograms from a plurality of respective views, wherein each sub-hologram is associated with holographic data encoding both magnitude and phase of said non-coherent electromagnetic radiation and being acquired at a different position and/or orientation of said physical aperture, such that the tiling of holographic data from said different positions and/or orientations defines a synthetic aperture which is larger than said physical aperture; and
   a processor having a circuit and being supplemented by a software product configured for tiling said sub-holograms to generate a mosaic hologram of the object, wherein a resolution power of said mosaic hologram is higher than a resolution power of each individual sub-hologram.

* * * * *